(12) United States Patent
Qian

(10) Patent No.: US 11,787,959 B2
(45) Date of Patent: Oct. 17, 2023

(54) RADIATION CURABLE GRAVURE INK

(71) Applicant: CHANGZHOU GREEN PHOTOSENSITIVE MATERIALS CO.,LTD., Jiangsu (CN)

(72) Inventor: Bin Qian, Jiangsu (CN)

(73) Assignee: CHANGZHOU GREEN PHOTOSENSITIVE MATERIALS CO., LTD., Jiangsu (CN)

( * ) Notice: Subject to any disclaimer, the term of this patent is extended or adjusted under 35 U.S.C. 154(b) by 31 days.

(21) Appl. No.: 16/982,076

(22) PCT Filed: Mar. 20, 2019

(86) PCT No.: PCT/CN2019/078860
§ 371 (c)(1),
(2) Date: Sep. 18, 2020

(87) PCT Pub. No.: WO2019/179460
PCT Pub. Date: Sep. 26, 2019

(65) Prior Publication Data
US 2021/0115276 A1   Apr. 22, 2021

(30) Foreign Application Priority Data

Mar. 20, 2018 (CN) .......................... 201810227961.4
Mar. 20, 2018 (CN) .......................... 201810227962.9
Mar. 20, 2018 (CN) .......................... 201810227986.4

(51) Int. Cl.
| | | |
|---|---|---|
| *C09D 11/10* | (2014.01) | |
| *C09D 11/101* | (2014.01) | |
| *B41F 9/06* | (2006.01) | |
| *C09D 11/037* | (2014.01) | |
| *C09D 11/102* | (2014.01) | |
| *C09D 11/106* | (2014.01) | |
| *C09D 11/107* | (2014.01) | |
| *C09D 11/108* | (2014.01) | |

(52) U.S. Cl.
CPC .............. *C09D 11/101* (2013.01); *B41F 9/06* (2013.01); *C09D 11/037* (2013.01); *C09D 11/102* (2013.01); *C09D 11/106* (2013.01); *C09D 11/107* (2013.01); *C09D 11/108* (2013.01)

(58) Field of Classification Search
CPC ........................................................ B41F 9/06
See application file for complete search history.

(56) References Cited

U.S. PATENT DOCUMENTS

| 6,232,361 B1 * | 5/2001 | Laksin ................... C08G 59/68 522/84 |
|---|---|---|
| 7,923,481 B2 * | 4/2011 | Gaudl .................... C08G 65/22 522/167 |
| 2009/0136759 A1 * | 5/2009 | Shintani ............... C08G 59/306 428/413 |

FOREIGN PATENT DOCUMENTS

| CN | 1344302 A | 4/2002 |
|---|---|---|
| CN | 103080181 A | 5/2013 |
| CN | 107001826 A | 8/2017 |
| CN | 107001838 A | 8/2017 |
| CN | 107286705 A | 10/2017 |
| CN | 107300829 A | 10/2017 |
| CN | 107300831 A | 10/2017 |
| CN | 107300832 A | 10/2017 |
| EP | 1905792 A1 | 4/2008 |
| EP | 1967561 A1 | 9/2008 |
| EP | 2678395 A1 | 1/2014 |
| EP | 3085546 A1 | 10/2016 |
| JP | 2007211200 A | 8/2007 |
| WO | 2006134767 A1 | 5/2006 |
| WO | 2017019026 A1 | 2/2017 |

OTHER PUBLICATIONS

Rozalia Szentgyörgyvölgyi, Chapter12—Gravure Printing, Editor(s): Joanna Izdebska, Sabu Thomas,Printing on Polymers, William Andrew Publishing, 2016, pp. 199-215, (Year: 2016).*

* cited by examiner

*Primary Examiner* — Sanza L. McClendon
(74) *Attorney, Agent, or Firm* — Yu Gang

(57) ABSTRACT

A radiation curable gravure ink, comprising: cationic polymerizable compound comprising a hydroxyl-containing oxetane-based compound and an alicyclic epoxy-based compound; a cationic photoinitiator; a pigment; and filler.

19 Claims, No Drawings

RADIATION CURABLE GRAVURE INK

TECHNICAL FIELD

The disclosure relates to the technical field of radiation curing, in particular to radiation curable gravure ink and application thereof.

BACKGROUND

With the improvement of people's living standard, environmental protection and energy saving has become the general development trend of current printing and packaging industry. Gravure ink, also known as gravure liquid ink, is a colored colloidal dispersion that can be coated on a substrate in an appropriate printing manner to impart a textual pattern and a variety of colors. As one of the important technical branches, gravure printing ink is required to meet the performance indexes such as non-toxic, harmless, non-combustible, non-explosive, and low VOC emission, and the corresponding industry standard "Technical requirement for environment labeling products-Gravure ink and flexographic ink" is also issued by the country. In this situation, water-based inks have been developed to replace solvent-based inks. However, water-based gravure inks have their own shortcomings, which are mainly manifested in high energy consumption, low production efficiency, poor ink adhesion, and being prone to reverse adhesion migration during printing.

In recent years, there have been reports on UV-curable gravure inks. For Embodiment, China Banknote Ink Co., Ltd. discloses a free radical-curable gravure ink in Chinese Patent No. CN 101486857 B, but the ink has the defects of incomplete drying of thick film and severe line shrinkage after the prints are cured. Chinese Patent No. CN 105368145 A discloses a cationic-curable gravure ink, which has good adhesion and excellent abrasion resistance compared with the free radical-curable ink, but has the problems of slow cuing speed, few types of prepolymers and reactive diluents, and high price; China Banknote Ink Co., Ltd. also discloses a free radical-cation-air drying ternary-curable gravure ink in Chinese Patent No. ZL 201510267026.7, which allows full play to the advantages of three curing modes of free radical, cation and air drying, but the mixed mode has the problems of poor compatibility among components, poor resistance, slow curing speed (only 50 m/min), and low production efficiency. For gravure printing technology, the printing speed generally needs to be higher than 150 m/min, and packaging products also have higher requirements in terms of adhesion fastness to the ink substrate, printability, and curing efficiency. At present, there is no radiation curable (e.g. UV-curable) gravure ink that can meet these requirements at the same time, resulting in that the technology has not been actually used on a large scale. At present, there is a great demand in the market for novel radiation curable gravure ink composition having low viscosity, fast curing speed, no volatile solvent, and excellent product adhesion and abrasion resistance.

Most of the gravure inks are volatile solvent-based inks, which consist of pigments, solid resins, volatile solvents, filler and additives. With the enhancement of people's awareness of environmental protection and energy saving, relatively "green" inks such as water-based inks, light-curable inks, and electron beam inks have gradually developed and gradually replaced solvent inks to be applied. For Embodiment, Chinese Patents of Application No. 200580017917.1, No. 201510267026.7 and No. 201510994588.1, and U.S. Patent of Publication No. US 2009/0136759 A disclose energy-curable gravure inks that do not contain volatile solvents. However, the prior arts mostly focus on ease of wiping off the ink on the engraved plate cylinder, appearance of the prints, adhesion, abrasion resistance, weather resistance, etc., with little concern about how to improve storage stability of the ink and improve the production efficiency, and also there is no effective solution.

SUMMARY

The disclosure mainly aims to provide a radiation curable gravure ink and use thereof, so as to solve the problems of high viscosity and slow curing speed of the gravure ink in the prior art.

To achieve the above objects, according to one aspect of the present disclosure, there is provided a radiation curable gravure ink comprising the following components: a cationic polymerizable compound comprising an oxetane-based compound and an epoxy-based compound, a cationic photoinitiator; a pigment.

Further, the above-mentioned radiation curable gravure ink comprises the following components: the cationic polymerizable compound comprising the oxetane-based compound containing a hydroxyl and an alicyclic epoxy compound; a cationic photoinitiator, a pigment; and a filer.

Further, the above-mentioned hydroxy-containing oxetane-based compound is selected from substituted or unsubstituted alkanes and alkenes in which at least one end-capping group is an oxetane group and contains a hydroxyl group, where H on the oxetane end-groups can be optionally substituted with $C_1$-$C_4$ alkyl groups.

Further, the above-mentioned hydroxy-containing oxetane-based compound is an alkane or an alkene having at least one end-capping group

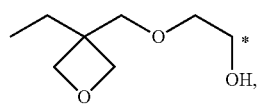

optionally, —$CH_2$— in non-end-capping groups can each independently be substituted with —O—, —COO—, —OCO—, —$SO_2$—, 1,4-phenylene or

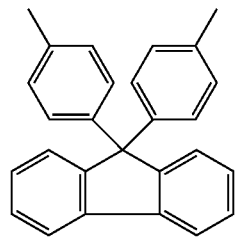 [SMILES: Cc1ccc(C2(c3ccc(C)cc3)c3ccccc3-c3ccccc32)cc1]

provided that the two O groups are not directly bound.

Further, the above-mentioned alicyclic epoxy-based compound is an epoxy compound having an epoxycyclohexyl group.

Further, a mass ratio of the above-mentioned hydroxy-containing oxetane compound to the alicyclic epoxy compound is (2-5):1, preferably (2-4):1.

Further, a mass ratio of the above cationic polymerizable compound to the radiation curable gravure ink is from 40% to 90%, preferably from 45% to 80%, still more preferably from 60% to 70%, preferably in terms of mass percentage, a content of the cationic photoinitiator in the gravure ink is from 1% to 25%, preferably from 3% to 20%, more preferably from 5% to 15%, still more preferably from 10% to 12%.

Further, the above-mentioned radiation curable gravure ink also includes a free radical polymerizable compound and a free radical photoinitiator.

Further, the above-mentioned free radical polymerizable compound is selected from an acrylate monomer compound or a methacrylate monomer compound.

Further, a mass ratio of the above-mentioned cationic polymerizable compound to the radiation curable gravure ink is from 30% to 80%, preferably from 40% to 70%, still more preferably from 40% to 60%, preferably a mass ratio of the free radical polymerizable compound to the radiation curable gravure ink is from 10% to 50%, preferably from 15% to 30%, still more preferably from 20% to 30%.

Further, the above-mentioned cationic photoinitiator is selected from one or a combination of two or more of a group consisted of iodonium salts, sulfonium salt, and arylferrocenium salt.

Further, in terms of mass percentage, a content of the above-mentioned cationic photoinitiator in the gravure ink is from 1% to 20%, preferably from 3% to 10%.

Further, in terms of mass percentage, a content of the above-mentioned free radical photoinitiator in the gravure ink is from 1% to 20%, preferably from 3% to 10%.

Further, the above-mentioned free radical polymerizable compound is selected from at least one of compounds having free radical polymerizable groups such as (meth) acryloyl, (meth) acryloyloxy, (meth) acrylamido, vinyl aryl, vinyl ether, and vinyloxycarbonyl.

Further, the above-mentioned free radical photoinitiator is selected from one or more of a group consisted of benzoin, acetophenone, α-hydroxyketone, α-aminoketone, acylphosphorus oxide, benzophenone, thioxanthone, anthraquinone, and oxime ester photoinitiators.

Further, the cationic photoinitiator is selected from at least one of

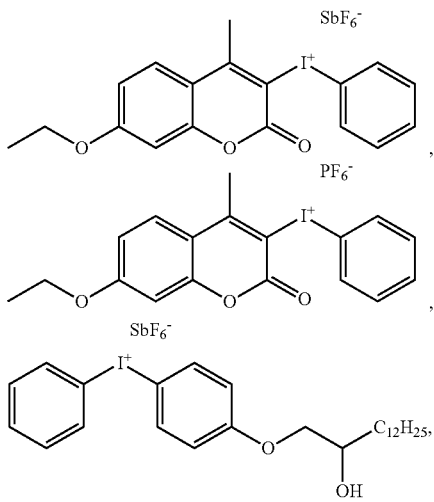

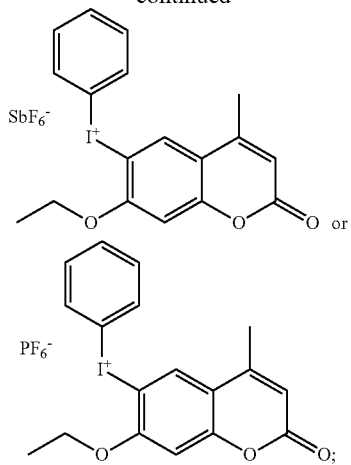

or selected from any one or more of a group consisted of compounds having a following structure shown in Formulae (I), (II), (III), and/or (V):

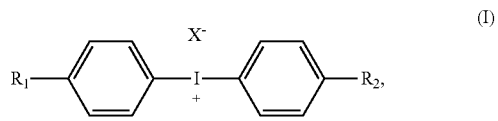
(I)

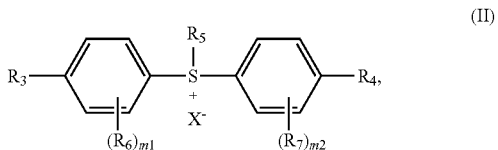
(II)

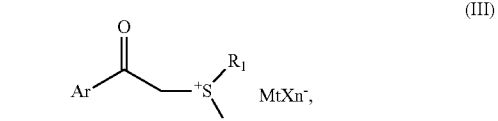
(III)

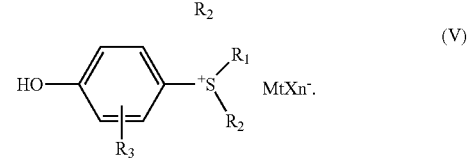
(V)

wherein, $R_1$ and $R_2$ each independently represent hydrogen, $C_1$-$C_{20}$ linear or branched alkyl, $C_4$-$C_{20}$ cycloalkylalkyl or alkylcycloalkyl, and the acyclic —$CH_2$— in these groups can be optionally substituted by —O—, —S— or 1,4-phenylene; $R_3$ and $R_4$ each independently represent hydrogen, $C_1$-$C_{20}$ linear or branched alkyl, $C_4$-$C_{20}$ cycloalkylalkyl or alkylcycloalkyl, $C_5$-$C_{20}$ substituted or unsubstituted aryl, and the acyclic —$CH_2$— in these groups can be optionally substituted by —O—, —S— or 1,4-phenylene; $R_5$ represents $C_6$-$C_{20}$ substituted or unsubstituted aryl, $C_5$-$C_{20}$ substituted or unsubstituted alkylaryl, $C_1$-$C_{20}$ straight or branched alkyl, $C_4$-$C_{20}$ cycloalkylalkyl or alkylcycloalkyl, substituted or unsubstituted thiophenylphenyl, and the acyclic —$CH_2$— in these groups can be optionally substituted by carbonyl, —O—, —S— or 1,4-phenylene; $R_6$ and $R_7$ each independently represent alkyl, hydroxyl, alkoxy, alkylcarbonyl, arylcarbonyl, alkoxycarbonyl, aryloxycarbonyl, arylthiocarbonyl, acyloxy, arylthio, aryl, heterocyclic hydrocarbon, aryloxy, alkylsulfinyl, arylsulfinyl, alkysulfonyl, arylsulfonyl, hydroxyl (poly) alkyleneoxy, substitutable amino, cyano, nitro, or a halogen atom, $m_1$ and $m_2$ each represent a number of $R_6$ and $R_7$ and represent an integer of 0 to 4; $X^-$ each independently represents $M^-$, $ClO_4^-$, $CN^-$, $HSO_4^-$, $NO_3^-$, $CF_2COO^-$, $(BM_4)^-$, $(SbM_6)^-$, $(AsM_6)^-$, $(PM_6)^-$, $Al[OC(CF_3)_3]_4^-$, sultanate ion, $B(C_5M_5)_4^-$ or $[(Rf)_b PF_{6-b}]^-$, wherein M is halogen, Rf represents alkyl with more than or equal to 80% of hydrogen atoms substituted by fluorine atoms, b represents an integer of 1-5, and b Rf groups are the same or different from each other; $MtXn^-$ is a non-nucleophilic anion, and is preferably selected from any one of $BF_4^-$, $ClO_4^-$, $FSO_3^-$, $PF_5^-$, $ASF_6^-$, $SbF_6^-$, $CF_3SO_3^-$ and $(C_5H_5)_4B^-$.

Further, the above-mentioned filer is selected from one or a mixture of two of nano calcium carbonate and silica.

Further, the above-mentioned radiation curable gravure ink also comprises a modified pigment, a free radical polymerizable compound and a free radical photoinitiator, preferably the modified pigment comprises a pigment and inorganic oxide nanoparticles coated on the surface of the pigment; the modified pigment has a DBP oil absorption of from 150 ml/100 g to 250 ml/100 g, a particle size of from 0.01 µm to 1 µm, and a pH of from 4.5 to 10.

Further, the above-mentioned inorganic oxide is selected from at least one of silica, titanium dioxide, iron oxide, and alumina.

Further, the above-mentioned modified pigment has a DBP oil absorption of from 200 ml/100 g to 250 ml/100 g, preferably from 215 ml/100 g to 235 ml/100 g, and a particle size of from 0.1 µm to 0.8 µm, preferably from 0.45 µm to 0.65 µm.

Further, a pH of the above-mentioned modified pigment is from 5 to 9, preferably from 5.5 to 8.

Further, the above-mentioned pigment is an organic pigment or an inorganic pigment, preferably the organic pigment is selected from any one of azo dyes, thioindigo dyes, indanthrone dyes, isoindanthrone dyes, anthanthrone dyes, anthraquinone dyes, isoviolanthrone dyes, triphenyldioxazine dyes, quinacridone dyes and phthalocyanine dyes, preferably the inorganic pigment is selected from any one of carbon black, titanium dioxide, silica, alumina, iron oxide and sulfide.

Further, the above-mentioned epoxy-based compound is an alicyclic epoxy compound, preferably the alicyclic epoxy compound is an epoxy compound having an epoxycyclohexyl group.

Further, the above-mentioned radiation curable gravure ink also comprises a sensitizer, preferably an anthracene sensitizer.

Further, a dominant wavelength of radiation source is in a range of from 250 nm to 450 nm.

According to another aspect of the present disclosure, there is provided application of any one of the above-mentioned radiation curable gravure inks in gravure printing.

Further, the above-mentioned application is gravure printing papers, plastics and films.

By applying the technical scheme of the disclosure, the cationic polymerizable compounds of the radiation curable gravure ink combines the oxetane-based compound and the epoxy-based compound, so that the viscosity of the radiation curable gravure ink is reduced, and the curing speed is accelerated.

DETAILED DESCRIPTION OF THE EMBODIMENTS

It should be noted that the Embodiments in the present disclosure and features in the Embodiments can be combined with each other in a non-conflicting situation. Hereinafter, the present disclosure will be described in detail with reference to Embodiments.

In order to solve the problems of high viscosity and slow curing speed of the gravure ink in the prior art, the present disclosure provides a radiation curable gravure ink which comprises the following components of cationic polymerizable compounds, a cationic photoinitiator and a pigment, wherein the cationic polymerizable compounds comprise an oxetane-based compound and an epoxy-based compound. In this present disclosure, as the cationic polymerizable compounds of the radiation curable gravure ink combines an oxetane-based compound and an epoxy-based compound, so that the viscosity of the radiation curable gravure ink is reduced, and the curing speed is accelerated.

In a first typical embodiment of the present application, the present disclosure provides a radiation curable gravure ink having low viscosity, high curing speed, excellent adhesion, good appearance of prints, and no odor, in view of the deficiencies in the prior art and the development needs of the field. The gravure ink adopts a cationic curing system, which combines a specific type of oxetane-based compound having low viscosity and high reactivity with an alicyclic epoxy compound to obtain the performances effectively.

Specifically, the above-mentioned radiation curable gravure ink comprises the following components: cationic polymerizable compounds comprising a hydroxyl-containing oxetane-based compound and an alicyclic epoxy compound; a cationic photoinitiator; a pigment; and a filler (optionally).

In a second typical embodiment of the present application, the present disclosure aims to provide a radiation curable gravure ink composition which does not contain a volatile solvent, has a low viscosity, is fast in cuing speed, and has excellent comprehensive properties of the cured coating, in view of the deficiencies in the prior art and the development needs of the field. The composition adopts a cation-free radical hybrid curing system, which allows full play to the characteristics of high free radical curing speed and no oxygen inhibition during cationic curing by selecting appropriate pre-polymerized monomers, so that the drying rate and the physical properties after drying are effectively improved, the odor is low after curing, and the appearance of prints is good.

Specifically, the radiation curable gravure ink in this present disclosure comprises the following components: cationic polymerizable compounds comprising a hydroxyl-containing oxetane-based compound and an alicyclic epoxy compound; a free radical polymerizable compound selected from (meth)acrylate monomer compounds; a cationic photoinitiator; a pigment; and a filler (optionally).

The components are described in more detail below.

<Cationic Polymerizable Compounds>

As a component cationic polymerizable compound, a hydroxyl-containing oxetane-based compound and an alicyclic epoxy compound are necessary components, and the combination of the two brings required reaction activity and application performance to the gravure ink.

"Hydroxyl-containing oxetane-based compound" as used herein has the meaning commonly understood in the art of organic chemistry, i.e., compounds containing at least one hydroxyl group and at least one oxetane group.

There are no particular restrictions on the specific types of hydroxyl-containing oxetane-based compound, however, in consideration of properties such as adhesion fastness, curing speed, and viscosity of the gravure ink, it is preferably selected from substituted or unsubstituted alkanes and alkenes in which at least one end-capping group is an oxetane group and contains a hydroxyl group, wherein H on the oxetane end-groups can be optionally substituted with $C_1$-$C_4$ alkyl groups.

More preferably, the above-mentioned hydroxy-containing oxetane-based compound is alkanes or alkenes having at least one end-capping group

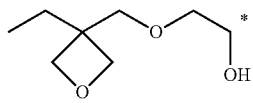

(* represents binding site), optionally, —$CH_2$— in non-end-capping groups can each independently be substituted with —O—, —COO—, —OCO—, —$SO_2$—, 1,4-phenylene or

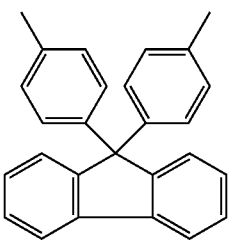 [SMILES: Cc1ccc(C2(c3ccc(C)cc3)c3ccccc3-c3ccccc32)cc1]

provided that the two O groups are not directly bound.

Exemplarily, the hydroxyl group-containing oxetane-based compound can be preferably selected from compounds having the following structures:

Compound 1

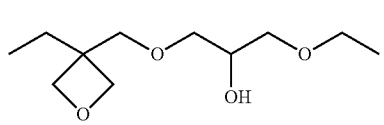

Compound 2

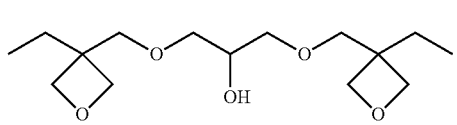

Compound 3

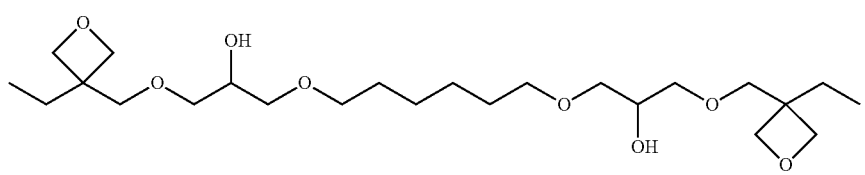

Compound 4

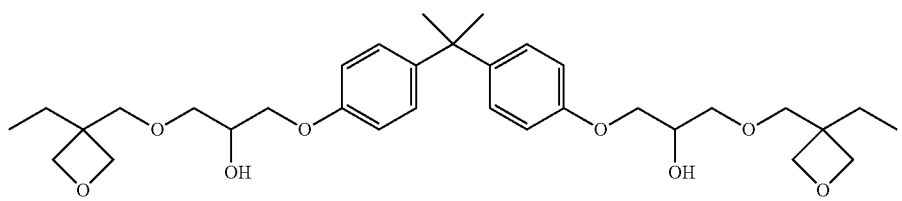

Compound 5

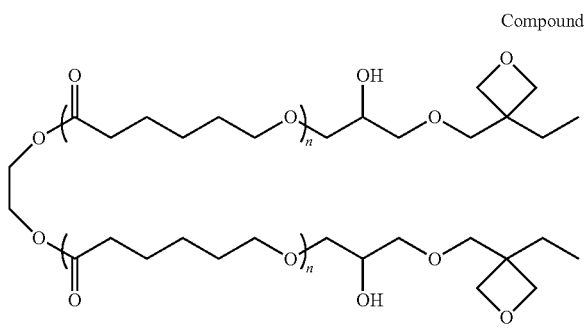

m + n = 7

Compound 6

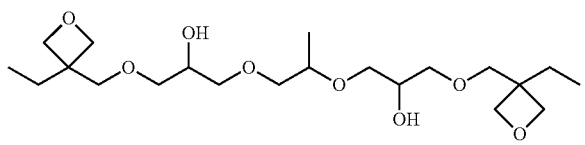

Compound 7

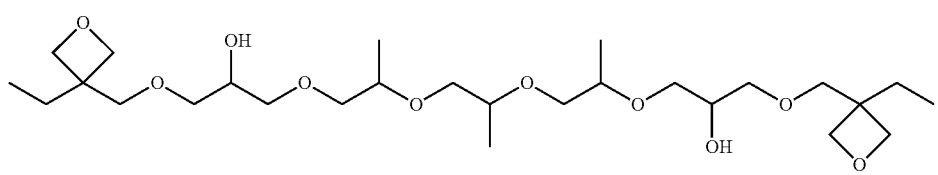

-continued
Compound 8
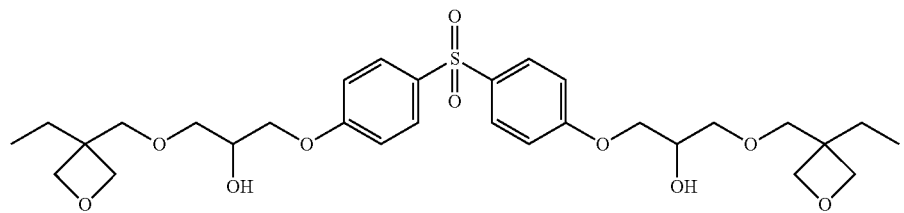
Compound 9
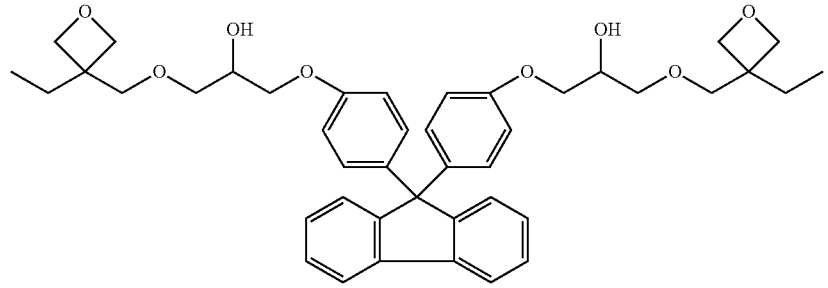
Compound 10
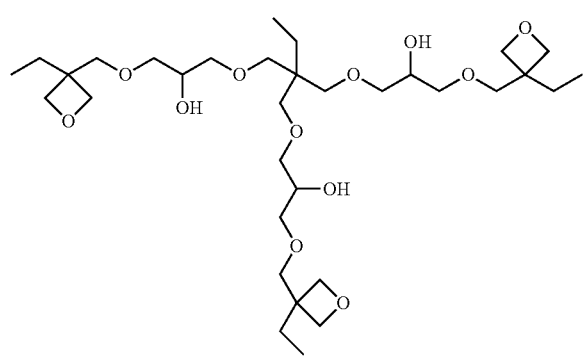
Compound 11
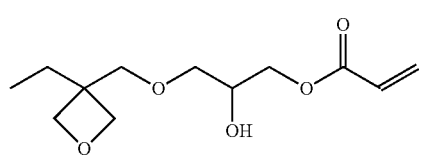
Compound 12
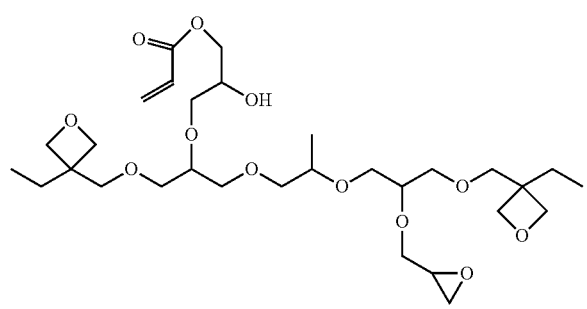
Compound 13
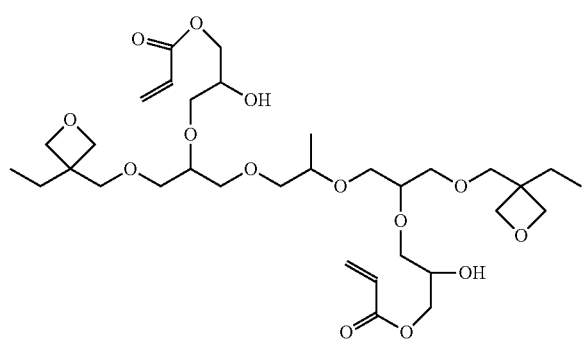
Compound 14
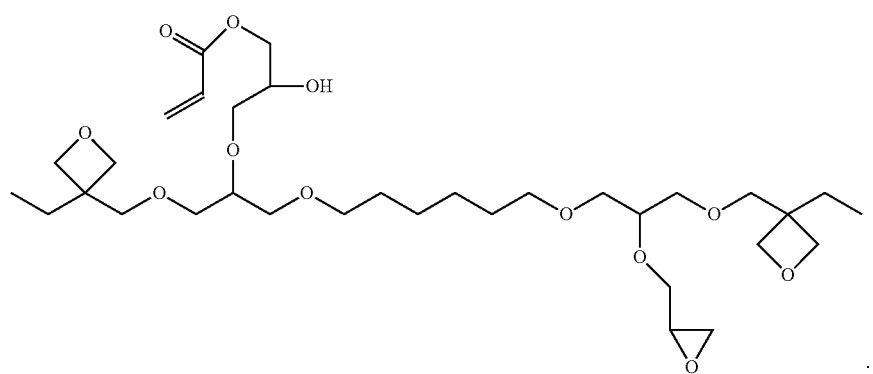

As used herein, an "alicyclic epoxy compound" refers to a compound having an alicyclic epoxy group. From the viewpoint of further improving the curing speed, it is conceivable to use a polyfunctional alicyclic epoxy compound having two or more alicyclic epoxy groups in the molecule, or an alicyclic epoxy compound having one alicyclic epoxy group and having an unsaturated double bond group such as a vinyl group in the molecule.

As the alicyclic epoxy compound applicable for the gravure ink in the present disclosure, it is preferably an epoxy compound having an epoxycyclohexyl group such as 3,4-epoxycyclohexylmethyl-3',4'-epoxycyclohexylcarboxylate, t-caprolactone-modified-3,4-epoxycyclohexylmethyl-3',4'-epoxycyclohexylcarboxylate, bis ((3,4-epoxycyclohexyl) methyl) adipate, epoxycyclohexane, 2-(3,4-epoxycyclohexane) ethyltrimethoxysilane, 3,4-epoxycyclohexylmethyl methacrylate, 3,4-epoxycyclohexyl methacrylate, 1,2-epoxy-4-vinylcyclohexane, 3,4-epoxycyclohexane carboxylate, a polymerization product of 3,4-epoxycyclohexylmethyl, 3,4-epoxycyclohexylcarboxylate and caprolactone, a polymerization product of 3,4-epoxycyclohexylmethyl 3,4-epoxycyclohexylcarboxylate and caprolactone, 4-methyl-1,2-epoxycyclohexane, 2,2-bis (3,3'-epoxycyclohexyl) propane and 2-(3,4-epoxycyclohexane) ethyltrimethoxysilane.

A mass ratio of the hydroxyl-containing oxetane-based compound to the alicyclic epoxy compound in the component cationic polymerizable compound is (2-5):1, preferably 2-4:1.

Optionally, the component cationic polymerizable compounds can include other classes of cationic polymerizable compounds in addition to the above-mentioned hydroxyl-containing oxetane-based compounds and alicyclic epoxy-based compounds, including, but not limited to: oxetane-based compounds and alicyclic epoxy-based compounds having structures different from the above two essential components, and vinyl ether compounds. The cost of the gravure ink can be optimized and the overall application performance of the gravure ink can be further regulated by properly using the other classes of cationic polymerizable compounds without affecting the purpose of the disclosure. Their total content (mass percentage) in the component cationic polymerizable compounds should be less than 40%, preferably less than 20%, more preferably less than 10%.

Other classes of oxetane-based compounds can be monofunctional or polyfunctional Examples of monofunctional groups include, but are not limited to: 3-methyl-3-hydroxymethyloxetane, 3-ethyl-3-hydroxymethyloxetane, 3-ethyl-3-(hexyloxymethyl) oxetane, 3-ethyl-3-(2-ethylhexyloxymethyl) oxetane, 3-ethyl-3-[(phenoxy) methyl] oxetane, 3-ethyl-3-(chloromethyl) oxetane, isobutoxymethyl (3-ethyl-3-oxetanylmethyl) ether, isobornylaxyethyl (3-ethyl-3-oxetanylmethyl) ether, isobornyl (3-ethyl-3-oxetanylmethyl) ether, 2-ethylhexyl (3-ethyl-3-oxetanylmethyl) ether, ethyldigycol (3-ethyl-3-oxetanylmethyl) ether and the like. Examples of polyfunctional groups include, but are not limited to: bis [1-ethyl (3-oxetanyl)] methyl ether, 3,3-bis (chloromethyl) oxetane, 3,7-bis (3-oxetanyl)-5-oxanonane, 1,2-bis [(3-ethyl-3-oxetanylmethoxy) methyl] ethane, 1,3-bis [(3-ethyl-3-oxetanylmethoxy) methyl] propane, ethylene glycol bis-(3-ethyl-3-oxetanylmethyl) ether, tricyclodecanediyl dimethylene (3-ethyl-3-oxetanylmethyl) ether, trimethylolpropane tris (3-ethyl-3-oxetanylmethyl) ether, 1,4-bis [(3-ethyl-3-oxetanylmethoxy) methyl] benzene, 1,4-bis (3-ethyl-3-oxetanylmethoxy) butane, 1,6-bis (3-ethyl-3-oxetanylmethoxy) hexane, pentaerythritol tris (3-ethyl-3-oxetanylmethyl) ether, pentaerythritol tetrakis (3-ethyl-3-oxetanylmethyl) ether, polyethylene glycol bis (3-ethyl-3-oxetanylmethyl) ether, dipentaerythritol hexa (3-ethyl-3-oxetanylmethyl) ether, dipentaerythritol penta (3-ethyl-3-oxetanylmethyl) ether, dipentaerythritol tetrakis (3-ethyl-3-oxetanylmethyl) ether and the like. In addition, those oxetane-based compounds disclosed in Chinese Patents application No. 201610548580.7, No. 201610550205.6, No. 201710706339.7 and No. 201710622973.2, which are incorporated herein by reference in their entirety, can also be used in the composition.

As other classes of epoxy-based compounds, it can be a hydrogenated epoxy compound, an aromatic epoxy compound, and/or an aliphatic epoxy compound.

The above-mentioned hydrogenated epoxy compound is preferably a compound having a glycidyl ether group directly or indirectly bonded to a saturated aliphatic cyclic hydrocarbon skeleton, and a polyfunctional glycidyl ether compound is applicable. Such hydrogenated epoxy compounds are preferably completely or partially aromatic hydrogenated product of epoxy compounds, more preferably hydrogenated products of aromatic glycidyl ether compounds, and still more preferably hydrogenated product of aromatic multifunctional glycidyl ether compounds. In particular, it can be selected from hydrogenated bisphenol A type epoxy compounds, hydrogenated bisphenol S type epoxy compounds, hydrogenated bisphenol F type epoxy compounds and the like.

The above-mentioned aromatic epoxy compound is a compound having an aromatic ring and an epoxy group in the molecule. The aromatic epoxy compound may be an epoxy compound having an aromatic ring conjugate system such as a bisphenol skeleton, a fluorene skeleton, a biphenyl skeleton, a naphthalene ring, and an anthracene ring. Wherein, in order to achieve a higher refractive index, the aromatic epoxy compound is preferably a compound having a bisphenol skeleton and/or a fluorene skeleton, more preferably a compound having a fluorene skeleton, whereby the refractive index can be more remarkably improved, and the demoldability can be further improved. In addition, the aromatic epoxy compound is preferably a compound with the epoxy group being a glycidyl group, more preferably a compound with the epoxy group being a glycidyl ether group (i.e., an aromatic glycidyl ether compound). In addition, it is applicable to use a bromide of an aromatic epoxy compound because a higher refractive index can also be achieved, but since the Abbe number is slightly increased, it is preferably used as appropriate according to the application.

Preferred examples of the above-mentioned aromatic epoxy compound include a bisphenol A type epoxy compound, a bisphenol F type epoxy compound, a fluorene type epoxy compound: an aromatic epoxy compound having a bromine substituent and the like.

The above-mentioned aromatic glycidyl ether compound can be Epi-bis type glycidyl ether type epoxy resin, high molecular weight Epi-bis type glycidyl ether type epoxy resin, novolak, aralkyl type glycidyl ether type epoxy resin and the like.

The Epi-bis type glycidyl ether type epoxy resin can be a resin obtained by a condensation reaction of bisphenols such as bisphenol A, bisphenol F, bisphenol S, and fluorene bisphenol with epihalohydrin.

The high molecular weight Epi-bis type glycidyl ether type epoxy resin can be a resin obtained by an addition reaction of Epi-bis type glycidyl ether type epoxy resin with bisphenols such as bisphenol A, bisphenol F, bisphenol S, and fluorene bisphenol.

Preferred examples of the above-mentioned aromatic glycidyl ether compound include, but are not limited to: bisphenol A type compounds such as 828EL, 1003, and 1007 produced by Japanese Epoxy Manufacturers, and fluorene type compounds such as ONCOATEX-1020, ONCOATEX-1010, OGSOLEG-210, and OGSOLLPG produced by OSAKAGAS CHEMICALS.

The above-mentioned aliphatic epoxy compound is a compound having an aliphatic epoxy group, such as an aliphatic glycidyl ether type epoxy resin. Preferred examples of the aliphatic glycidylether type epoxy resin include, but are not limited to, a resin obtained by a condensation reaction of a polyhydroxy compound with epoxy halopropane, wherein the polyhydroxy compound is selected from the group consisting of ethylene glycol, diethylene glycol, triethylene glycol, tetraethylene glycol, polyethylene glycol, propylene glycol, dipropylene glycol, tripropylene glycol, tetrapropylene glycol, polypropylene glycol, glycerol, diglycerol, tetraglycerol, polyglycerol, trimethylolpropane and its polymers, pentaerythritol and its polymers, mono/polysaccharides (e.g., glucose, fructose, lactose, maltose, etc.) and the like. Wherein, an aliphatic glycidyl ether type epoxy resin having a propylene glycol skeleton, an alkylene skeleton, and an alkylene oxide skeleton in the central skeleton is more applicable.

Examples of the above-mentioned vinyl ether compounds include, but are not limited to: aryl vinyl ethers such as phenyl vinyl ethers; alkyl vinyl ethers such as n-butyl vinyl ether and n-octyl vinyl ether; cycloalkyl vinyl ethers such as cyclohexyl vinyl ethers; hydroxyl-containing vinyl ethers such as 2-hydoxyethyl vinyl ether, diethylene glycol monovinyl ether, and 2-hydroxybutyl vinyl ether; multifunctional vinyl ethers such as hydroquinone divinyl ether, 1,4-butanediol divinyl ether, cyclohexane divinyl ether, cyclohexane dimethanol divinyl ether, ethylene glycol divinyl ether, diethylene glycol divinyl ether, and triethylene glycol divinyl ether.

In addition to the above-mentioned compounds, the other classes of cationic polymerizable compounds can also be compounds having different classes of cationic polymerizable groups within the molecule. For example, those compounds described in Japanese No. 2009-242242 can be used as examples having both an epoxy group (e.g., an alicyclic epoxy group) and a vinyl ether group in the molecule; those compounds described in Japanese No. 2008-266308 can be used as examples having both oxetanyl and vinyl ether groups in the molecule.

A content of the component cationic polymerizable compound in the gravure ink can be appropriately adjusted according to the type and performance requirements of the substrate. In a first typical embodiment, a mass ratio of the component cationic polymerizable compounds in the radiation curable gravure ink of the present disclosure is properly from 40% to 90%, preferably from 45% to 80%, still more preferably from 60% to 70%. In a second typical embodiment, a mass ratio of the component cationic polymerizable compounds in the radiation curable gravure ink of the present disclosure is properly from 30% to 80%, preferably from 40% to 70%, still more preferably from 40% to 60%.

<Cationic Photoinitiators>

After determining the component cationic polymerizable compounds, it is relatively easy for the skilled in the art to select applicable cationic photoinitiators. In general, it is possible to try to use those existing photoinitiators in existing oxetane and/or epoxy cationic photocuring systems.

In the gravure ink of the present disclosure, preferably, the component cationic photoinitiator is selected from one or a combination of two or more of a group consisted of iodonium salt, sulfonium salt, and arylferrocenium salt.

Based on the consideration of cost and combined effects such as photoinitiation efficiency, curing speed and other integrated factors, the component cationic photoinitiator is preferably an iodonium salt and/or sulfonium salt photoinitiator, such as selected from at least one of

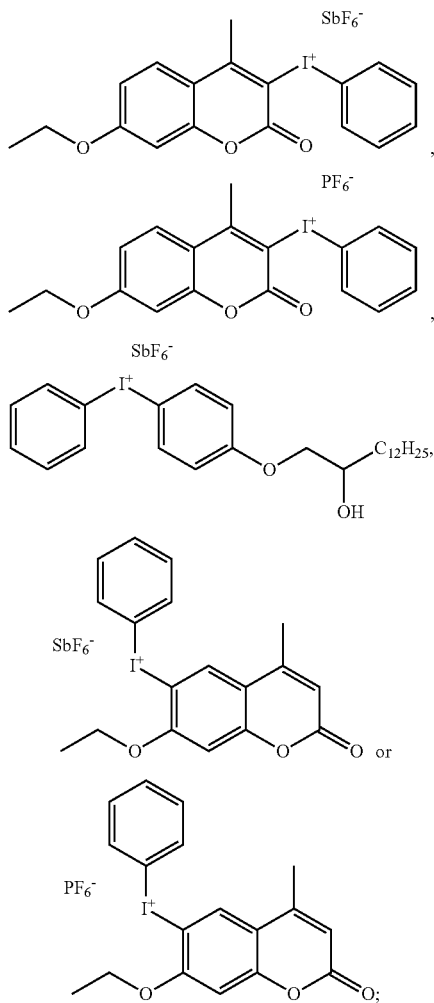

or selected from any one or more of a group consisted of compounds having the following structures shown in Formulae (I), (II), (III) and/or (V):

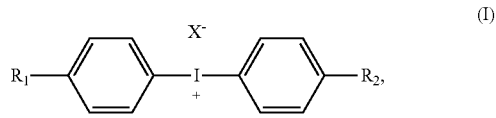

(I)

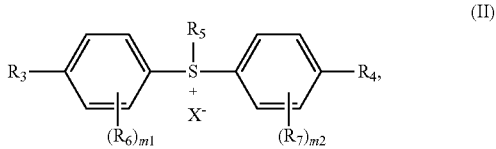

(II)

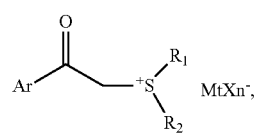

(III)

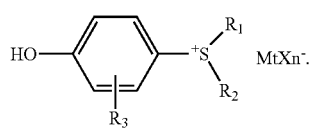

(V)

wherein, $R_1$ and $R_2$ each independently represent hydrogen, $C_1$-$C_{20}$ linear or branched alkyl, $C_4$-$C_{20}$ cycloalkylakyl or alkylcycboalkyl, and the acyclic —$CH_2$— in these groups can be optionally substituted by —O—, —S— or 1,4-phenylene;

$R_3$ and $R_4$ each independently represent hydrogen, $C_1$-$C_{20}$ linear or branched alkyl, $C_4$-$C_{20}$ cycloalkylalkyl or alkylcycloalkyl, $C_6$-$C_{20}$ substituted or unsubstituted aryl, and the acyclic —$CH_2$— in these groups can be optionally substituted by —O—, —S— or 1,4-phenylene;

$R_5$ represents $C_0$-$C_{20}$ substituted or unsubstituted aryl, $C_6$-$C_{20}$ substituted or unsubstituted alkylaryl, $C_1$-$C_{20}$ straight or branched alkyl, $C_4$-$C_{20}$ cycloalkylalkyl or alkylcycloalkyl, substituted or unsubstituted thiophenylphenyl, and the acyclic —$CH_2$— in these groups can be optionally substituted by carbonyl, —O—, —S— or 1,4-phenylene;

$R_5$ and $R_7$ each independently represent alkyl, hydroxyl, alkoxy, alkylcarbonyl, arylcarbonyl, alkoxycarbonyl, aryloxycarbonyl, arylthiocarbonyl, acyloxy, arylthio, aryl, heterocyclic hydrocarbon, aryloxy, alkylsulfinyl, arylsulfinyl, alkylsulfonyl, arylsulfonyl, hydroxyl (poly) alkyleneoxy, substitutable amino, cyano, nitro, or a halogen atom, $m_1$ and $m_2$ each represent the number of $R_6$ and $R_7$ and represent an integer of 0 to 4;

$X^-$ each independently represents $M^-$, $ClO_4^-$, $CN^-$, $HSO_4^-$, $NO_3^-$, $CF_3COO^-$, $(BM_4)^-$, $(SbM_5)^-$, $(AsM_6)^-$, $(PM_5)^-$, $Al[OC(CF_3)_3]_4^-$, sulfonate ion, $B(C_6M_5)_4^-$ or $[(Rf)_bFF_{5-b}]^-$, wherein M is halogen, Rf represents alkyl with more than or equal to 80% of hydrogen atoms substituted by fluorine atoms, b represents an integer of 1-5, and b of Rf groups are the same or different from each other; $MtX_n^-$ is a non-nucleophilic anion, and is preferably selected from any one of $BF_4^-$, $ClO_4^-$, $FSO_3^-$, $PF_6^-$, $ASF_6^-$, $SbF_6^-$, $CF_3SO_3^-$ and $(C_6H_5)_4B^-$.

As a preferred structure, in the compounds of Formulae (I) and (II):

$R_1$ and $R_2$ each independently represent hydrogen, $C_1$-$C_{12}$ linear or branched alkyl, $C_4$-$C_{10}$ cycloalkylalkyl or alkylcycloalkyl, and the acyclic —$CH_2$— in these groups can be optionally substituted by —O—;

$R_3$ and $R_4$ each independently represent hydrogen, $C_1$-$C_{10}$ linear or branched alkyl, $C_4$-$C_{10}$ cycloalkylalkyl or alkylcycloalkyl, $C_6$-$C_{12}$ substituted or unsubstituted aryl, and the acyclic —$CH_2$— in these groups can be optionally substituted by —O—, —S— or 1,4-phenylene;

$R_5$ represents $C_6$-$C_{10}$ substituted or unsubstituted aryl, $C_5$-$C_{10}$ substituted or unsubstituted alkylaryl, substituted or unsubstituted thiophenylphenyl, and the acyclic —$CH_2$— in these groups can be optionally substituted by carbonyl, —O—, —S— or 1,4-phenylene;

$R_6$ and $R_7$ represent $C_1$-$C_{10}$ linear or branched alkyl, $C_1$-$C_{10}$ linear or branched alkoxy, $C_1$-$C_{10}$ alkylcarbonyl group and halogen.

Even more preferably, the above-mentioned iodonium and sulfonium salts photoinitiators cationic moieties can include the following structures:

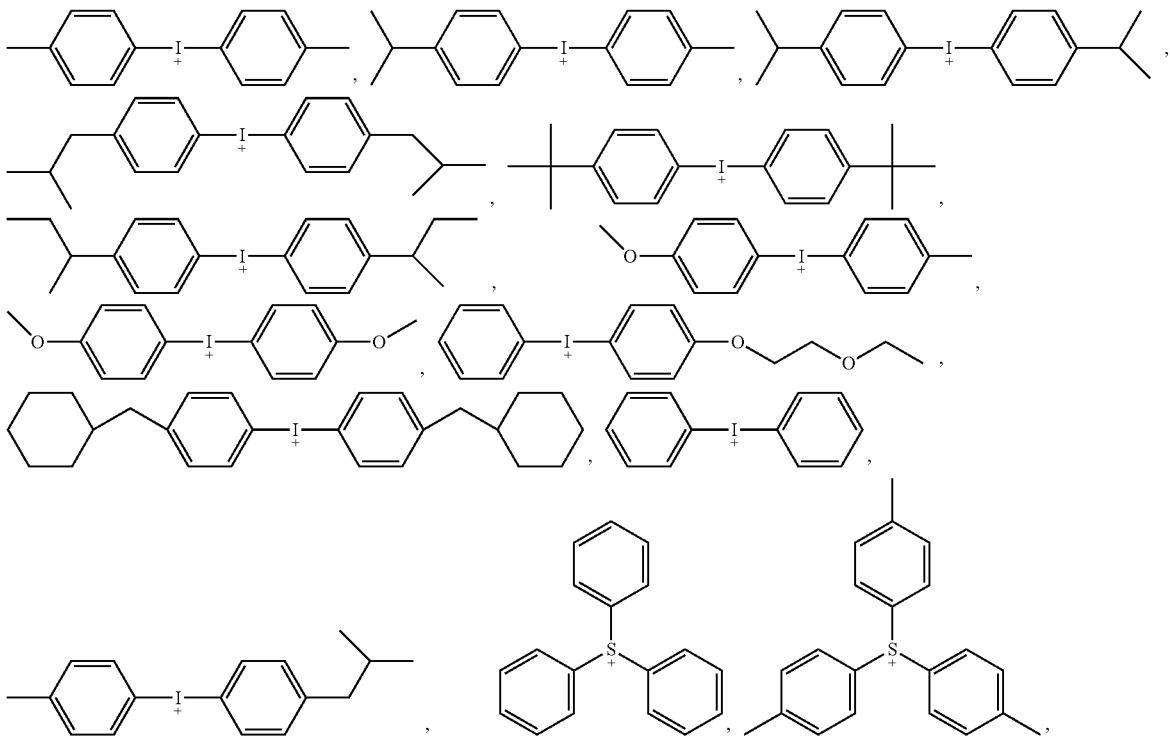

-continued
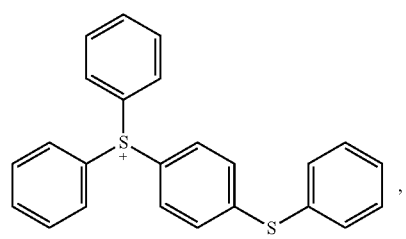
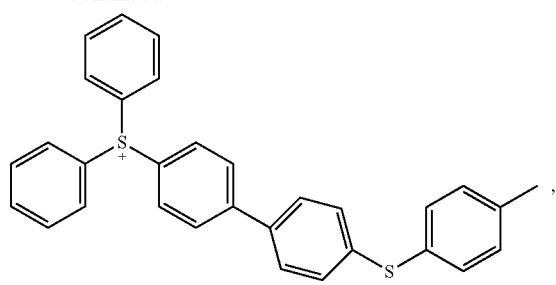
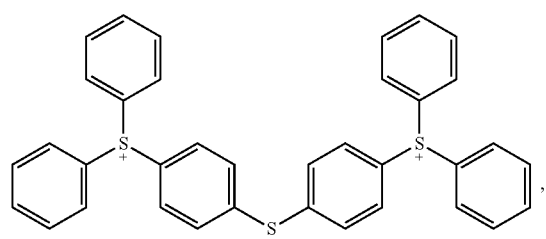
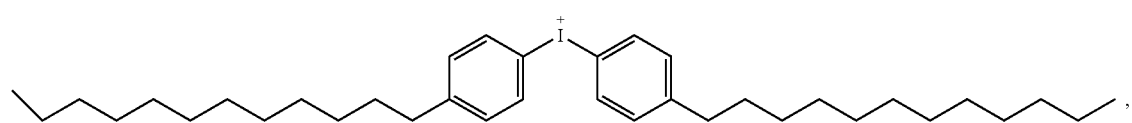
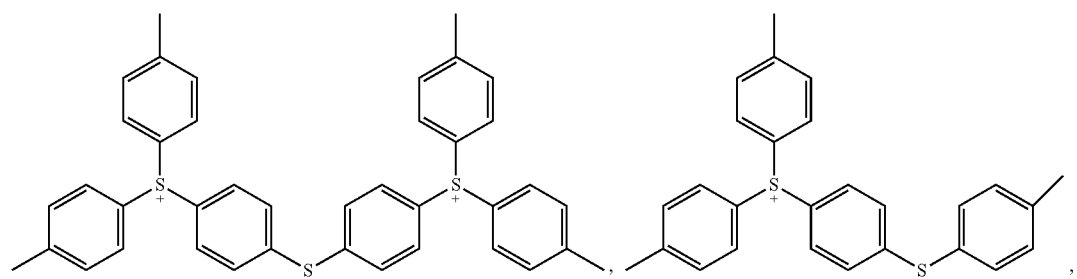
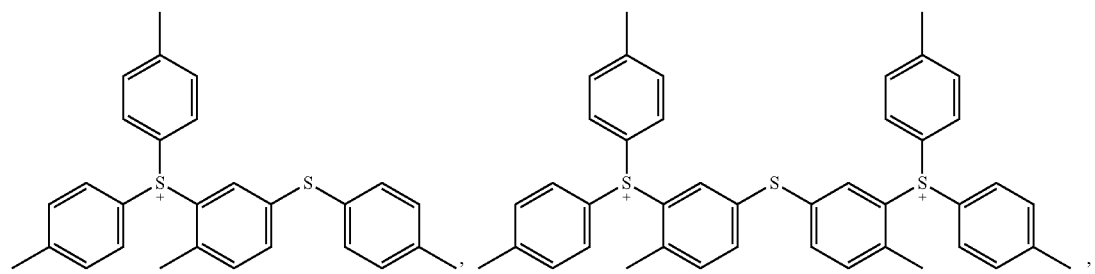

-continued

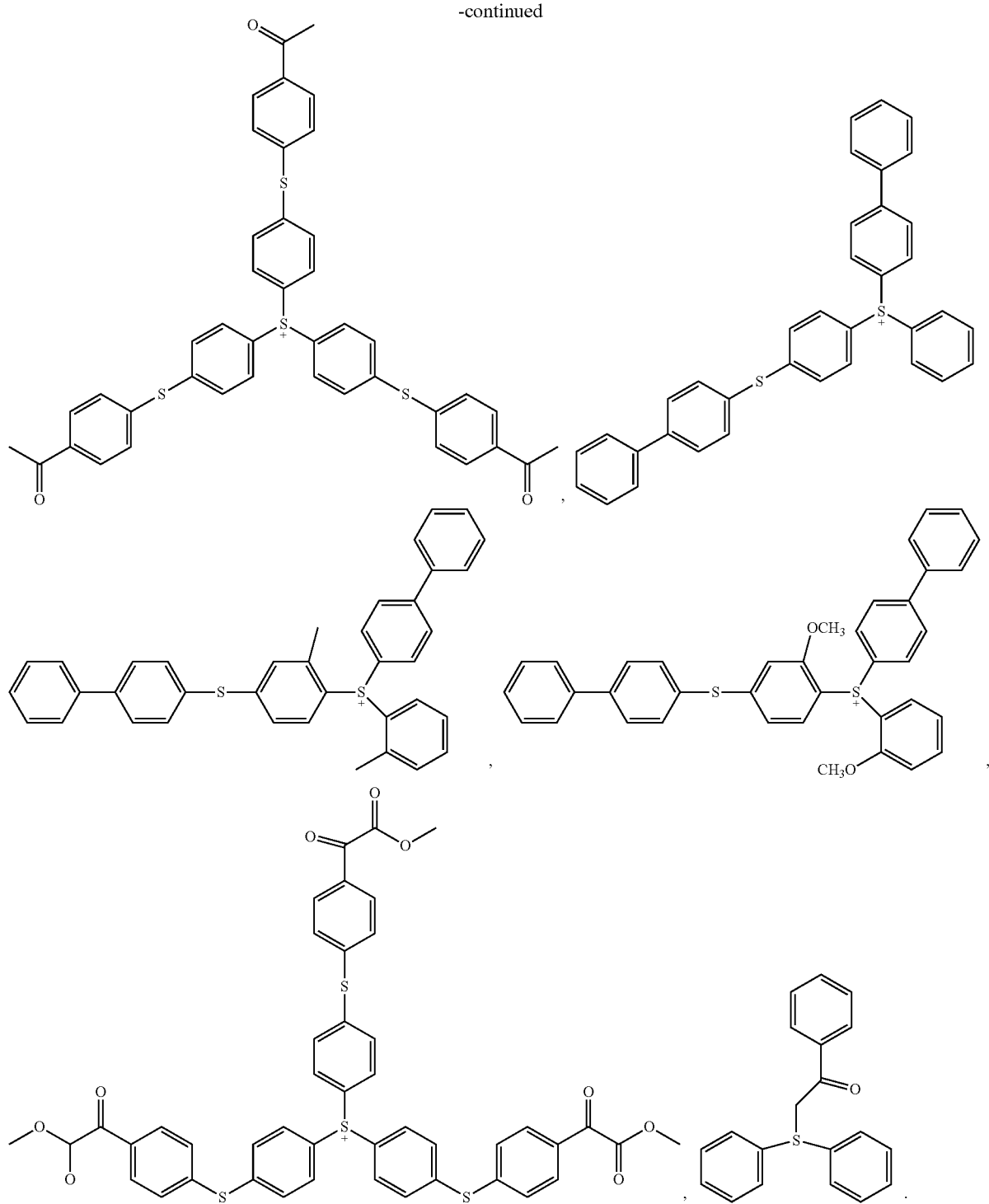

Even more preferably, the above-mentioned iodonium and sulfonium salts photoinitiators cationic moieties can include: $Cl^-$, $Br^-$, $PF_5^-$, $SbF_5^-$, $AsF_6^-$, $BF_4^-$, $C_4F_9SO_3^-$, $B(C_6H_5)_4^-$, $CF_3SO_3^-$, $CF_3SO_3^-$, $Al[OC(CF_3)_3]_4^-$, $(CF_3CF_2)_2 PF_4^-$, $(CF_3CF_2)_3PF_3^-$, $[(CF_2)_2CF_2]_2PF_4^-$, $[(CF_3)_2 CF_2]_3 PF_3^-$, $[(CF_3)_2CFCF_2]_2PF_4^-$, and $(CF_3)_2 CFCF_2]_3PF_3^-$.

In addition, commercially available cationic photoinitiators with the same structures can also be used in the components of the present disclosure, including but not limited to: products having trade names of PAG 20001, PAG 20002, PAG 30201, and PAG 30101 (manufactured by Changzhou Tronly Chemical Engineering Co., Ltd.), and Irgacure 250 manufactured by BASF.

In a first typical embodiment, in terms of mass percentage, a content of component cationic photoinitiator in the gravure ink of the present disclosure is from 1% to 25%, preferably from 3% to 20%, more preferably from 5% to 15%, and still more preferably from 10% to 12%. In a second typical embodiment, in terms of mass percentage, a content of component cationic photoinitiator in the gravure ink of the present disclosure is from 1% to 20%, preferably from 3% to 10%.

<Free Radical Polymerizable Compounds>

Common types of free radical polymerizable compounds are readily known to those skilled in the art of radiation curing. In the gravure ink composition of the present disclosure, the radically polymerizable compound as a component is selected from (meth) acrylate monomer compounds.

Examples can include but are not limited to: methyl (meth) acrylate, ethyl (meth) acrylate, n-butyl (meth) acrylate, isobutyl (meth) acrylate, tert-butyl (meth) acrylate, isoamyl (meth) acrylate, cyclohexyl (meth) acrylate, n-hexyl (meth) acrylate, 2-ethylhexyl (meth) acrylate, isodecyl (meth) acrylate, n-dodecyl (meth) acrylate, isotetradecyl (meth) acrylate, n-octadecyl (meth) acrylate, n-butoxyethyl (meth) acrylate, butoxydiethylene glycol (meth) acrylate, methoxytriethylene glycol (meth) acrylate, methoxypolyethylene glycol (meth) acrylate, tetrahydrofurfuryl (meth) acrylate, benzyl (meth) acrylate, phenoxyethyl (meth) acrylate, isobornyl (meth) acrylate, 2-hydroxyethyl (meth) acrylate, 2-hydroxypropyl (meth) acrylate, 2-hydroxybutyl (meth) acrylate, dimethylaminoethyl (meth) acrylate, diethylaminoethyl (meth) acrylate, 2-methacryloyloxyethyl-2-hydroxypropyl phthalate, glycidyl (meth) acrylate, 2-(phosphonooxy) ethyl 2-methyl-2-acrylate, ethylene glycol di (meth) acrylate, diethylene glycol di (meth) acrylate, triethylene glycol di (meth) acrylate, tripropylene glycol di (meth) acrylate, 1,4-butylene glycol di (meth) acrylate, neopentyl glycol di (meth) acrylate, 1,6-hexanediol di (meth) acrylate, 1,9-nonanediol di (meth) acrylate, 1,10-decanediol di (meth) acrylate, trimethylolpropane triacrylate, glycerol di (meth) acrylate, 2-hydroxy 3-acryloyloxypropyl (meth) acrylate, dimethyloltricyclodecane di (meth) acrylate, trifluoroethyl (meth) acrylate, perfluorooctylethyl (meth) acrylate, γ-(meth) acryloyloxypropyl trimethoxysilane, 2-(meth) acryloyloxyethyl isocyanate, 1,1-bis (acryloyloxy) ethyl isocyanate, 2-(2-methacryloyloxyethoxy) ethyl isocyanate and the like.

In a second typical embodiment, a mass ratio of the component free radical polymerizable compounds in the radiation curable gravure ink of the present disclosure is properly from 10% to 50%, preferably from 15% to 30%, still more preferably from 20% to 30%.

<Free Radical Photoinitiators>

After determining the component free radical polymerizable compounds, it is relatively easy for the skilled in the art to select applicable cationic photoinitiators. In general, it is possible to try to use those existing photoinitiators in the existing (meth) acrylate free radical photocuring systems, for example, it can be selected from one or more of a group consist of benzoin, acetophenone, α-hydroxyketone, α-aminoketone, acylphosphorus oxide, benzophenone, thioxanthone, anthraquinone, and oxime ester photoinitiators.

Examples include, but are not limited to: products under the trade names Irgacure 651, Irgacure 184, Irgacure 907, Irgacure 369, Irgacure 500, Irgacure 1000, Irgacure 819, Irgacure 1700, Irgacure 261, Irgacure 784, Irgacure 1173, Irgacure 2959, Irgacure 4265, and Irgacure 4263 (manufactured by BASF); products under the trade names SR 1130, SR 1137, SR 1136, SR 1135, SR 1010, SR 1011, SR 1012, and SR 1125 (manufactured by Sartomer) and the like.

In a second typical embodiment, in terms of mass percentage, a content of component free radical photoinitiator in the gravure ink of the present disclosure is from 1% to 20%, preferably from 3% to 10%.

<Pigments>

A gravure ink usually contains one or more pigments as colorants. The pigment can be an inorganic pigment or an organic pigment, and can be any color, including but not limited to black, blue, brown, cyan, green, white, violet, magenta, red, orange, and yellow, and spot colors of mixtures thereof.

Applicable organic pigments can be perylene, phthalocyanine dyes (e.g. phthalocyanine green, phthalocyanine blue), cyanine pigments (Cy3, Cy5 and Cy7), naphthalocyanine pigments, nitroso pigments, azo pigments, diazo pigments, diazo condensation pigments, basic dye pigments, basic blue pigments, indigo pigments, phloxin pigments, quinacidone pigments, isoindolinone pigments, dioxazine pigments, carbazole dioxazine violet pigments, alizarin lake pigments, phthalamide pigments, carmine lake pigments, tetrachloroisoindolinone pigments, violet cyclic ketone pigments, anthraquinone pigments, quinophthalone pigments and the like, and a mixture of two or more of the above or derivatives of the above.

Applicable inorganic pigments include, for Embodiment, metal oxides (e.g., titanium dioxide, conductive titanium dioxide), iron oxides (e.g., red iron oxide, yellow iron oxide, black iron oxide, and transparent iron oxide), aluminum oxides, silicon oxides, carbon black pigments, metal sulfides, metal chlorides, and the like, and mixtures of two or more thereof.

In the gravure ink of a first typical embodiment and the gravure ink composition of a second typical embodiment in the present disclosure, in terms of mass percentage, a content of the component pigment is from 2% to 20%, preferably from 5% to 15%.

In a third typical embodiment of the present disclosure, in view of the deficiencies and technical development needs of the prior art, it is an object of the present disclosure to provide a radiation curable gravure ink composition containing modified pigments. By adopting a cation-radical hybrid curing system and containing specific modified pigments, the ink composition does not contain any volatile organic solvents, is low in viscosity, good in storage stability, excellent in curing speed, good in appearance of cured prints, excellent in adhesion and abrasion resistance, and being odorless.

In particular, the radiation curable gravure ink composition of the present disclosure comprises: modified pigments, cationic polymerizable compounds, free radical polymerizable compounds, cationic photoinitiators, and free radical photoinitiators.

The components are described in more detail below.

<Modified Pigments>

Pigment is an important component in gravure ink, which is dispersed in the ink film with very small particles, and mainly plays the role of coloring and covering. The storage stability, viscosity, curing speed and printing performance of the ink are greatly affected by the larger amount of pigment added in the ink.

According to a third typical embodiment of the present disclosure, the component-modified pigment comprises a pigment and inorganic oxide nanoparticles coated on the surface of the pigment; the modified pigment has a DBP oil absorption of from 150 ml/100 g to 250 m/100 g, a particle size of from 0.01 μm to 1 μm, and a pH of from 4.5 to 10.

The inventors have surprisingly found that coating the pigment surface with inorganic oxide nanoparticles can effectively prevent pigment agglomeration. The modified pigment can greatly improve the lipophilicity and wettability thereof, and can promote the stability of the ink dispersion system. The oxide is selected from at least one of silica, titanium dioxide, iron oxide, and alumina. The pigments can be organic and inorganic pigments. Applicable organic pigments include: azo (including disazo and condensed azo), thioindigo, indanthrone, isoindanthrone, anthanthrone, anthraquinone, isoviolanthrone, tribenzoxazine, quinacridone and phthalocyanine dye series. Preferred organic pigments are phthalocyanine dyes (especially copper phthalocyanine pigments), azo pigments, indanthrones, anthanthrone and quinacridones. Applicable inorganic pigments include: carbon black, titanium dioxide, silica, alumina, iron oxide and sulfides.

The inventors have found in experiments that the oil absorption and particle size of the modified pigment have a direct impact on the color tone of the printed pattern and the appearance of the prints. The modified pigment has a DBP oil absorption of preferably from 150 m/100 g to 250 ml/100 g, preferably from 200 ml/00 g to 250 m/100 g, still more preferably from 215 ml/100 g to 235 ml/100 g, measured according to the standard GB/T 5211.15-1988. The modified pigment has an appropriate particle size in the range of from 0.01 μm to 1 μm, preferably from 0.1 μm to 0.8 μm, still more preferably from 0.45 μm to 0.65 μm.

The existing gravure inks in the field generally do not limit the pH of the pigment contained therein. However, the researchers of the present disclosure found that when the pH of the pigment used is less than or equal to 4, the ink is prone to be gelled in the storage tank, and the storage time will be shortened; when the pH of the pigment is greater than or equal to 10, the ink curing speed is significantly prolonged. Therefore, the inventors have determined an appropriate pH range through many experiments and repeated verifications, and the pH of the modified pigment is from 4.5 to 10, preferably from 5 to 9, and more preferably from 5.5 to 8.

The pigment's own properties, surface condition, processing conditions, surface treatment agents and other factors have an influence on the pH of the pigment. The pH of the modified pigment in the present disclosure is determined by dispersing it in distilled water and measuring the pH of the resulting solution with reference to the national standard GB/T1717-1986. The specific measurement methods include, a 10% (m/m) pigment suspension was prepared in a glass container with distilled water, the container was plugged with a stopper, followed by shaking vigorously for 1 min then standing for 5 min, the stopper was removed, and a pH of the suspension was measured to the nearest 0.1 unit.

In the radiation curable gravure ink composition in the above-mentioned third typical embodiment, in terms of mass percentage, a content of the modified pigment is from 2% to 20%, preferably from 5% to 15%.

<Cationic Polymerizable Compound>

Common cationic polymerizable compounds in the field of radiation curing include oxetane-based compounds, epoxy-based compounds and vinyl ether compounds.

In the gravure ink composition of the present disclosure, it is advantageous to use an oxetane-based compound as the cationic polymerizable compound to obtain a better curing speed. Meanwhile, preferably the oxetane-based compound and the epoxy-based compound are used in combination based on physical characteristics such as appearance of prints, substrate adhesion and the like.

Applicable oxetane-based compounds can be monofunctional or polyfunctional. Examples of monofunctional groups include, but are not limited to: 3-methyl-3-hydroxymethyloxetane, 3-ethyl-3-hydroxymethyloxetane, 3-ethyl-3-(hexyloxymethyl) oxetane, 3-ethyl-3-(2-ethylhexyloxymethyl) oxetane, 3-ethyl-3-[(phenoxy) methyl] oxetane, 3-ethyl-3-(chloromethyl) oxetane, isobutoxymethyl (3-ethyl-3-oxetanylmethyl) ether, isobornyloxyethyl (3-ethyl-3-oxetanylmethyl) ether: isobornyl (3-ethyl-3-oxetanylmethyl) ether, 2-ethylhexyl (3-ethyl-3-oxetanylmethyl) ether, ethyldigycol (3-ethyl-3-oxetanylmethyl) ether and the like. Examples of polyfunctional groups include, but are not limited to: bis [1-ethyl (3-oxetanyl)] methyl ether, 3,3-bis (chloromethyl) oxetane, 3,7-bis (3-oxetanyl)-5-oxanonane, 1,2-bis [(3-ethyl-3-oxetanylmethoxy) methyl] ethane, 1,3-bis [(3-ethyl-3-oxetanylmethoxy) methyl] propane, ethylene glycol bis-(3-ethyl-3-oxetanylmethyl) ether, tricyclodecanediylmethylene (3-ethyl-3-oxetanylmethyl) ether, trimethylolpropane tris (3-ethyl-3-oxetanylmethyl) ether, 1,4-bis [(3-ethyl-3-oxetanylmethoxy) methyl]benzene, 1,4-bis (3-ethyl-3-oxetanylmethoxy) butane, 1,6-bis (3-ethyl-3-oxetanylmethoxy) hexane, pentaerythritol tris (3-ethyl-3-oxetanylmethyl) ether, pentaerythritol tetrakis (3-ethyl-3-oxetanylmethyl) ether, polyethylene glycol bis (3-ethyl-3-oxetanylmethyl) ether, dipentaerythritol hexa (3-ethyl-3-oxetanylmethyl) ether, dipentaerythritol penta (3-ethyl-3-oxetanylmethyl) ether, dipentaerythritol tetrakis (3-ethyl-3-oxetanylmethyl) ether and the like. In addition, those oxetanes disclosed in Chinese Patent Application Nos. 201610548580.7, 201610550205.6, 201710706339.7 and 201710622973.2, which are incorporated herein by reference in their entirely, can also be used in the composition.

Still more preferably, the oxetane-based compound is selected from at least one of the following compounds from the viewpoint of overall application performance.

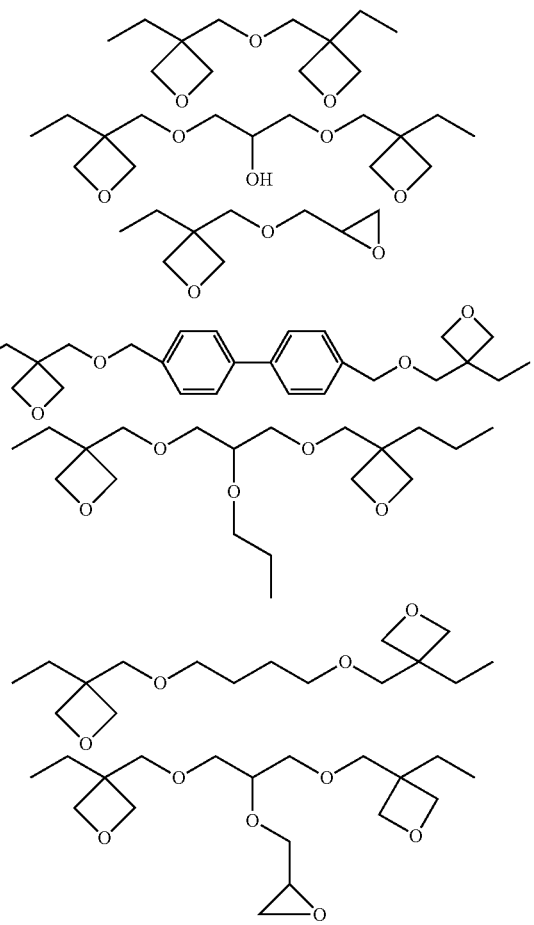

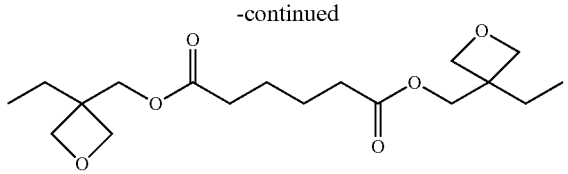

As an applicable epoxy-based compound, the epoxy-based compound can be at least one of an alicyclic epoxy compound, a hydrogenated epoxy compound, an aromatic epoxy compound, an aliphatic epoxy compound, preferably an alicyclic epoxy compound.

As used herein, an "alicyclic pound" refers to a compound having an alicyclic epoxy group. From the viewpoint of further improving the curing speed, it is conceivable to use a polyfunctional alicyclic epoxy compound having two or more alicyclic epoxy groups in the molecule, or an alicyclic epoxy compound having one alicyclic epoxy group in the molecule and having an unsaturated double bond group such as a vinyl group.

As the alicyclic epoxy compound applicable for the gravure ink in the present disclosure, it is preferably an epoxy compound having an epoxycyclohexyl group such as 3,4-epoxycyclohexylmethyl-3',4'-epoxycyclohexylcarboxylate, ε-caprolactone-modified-3,4-epoxycyclohexylmethyl-3',4'-epoxycyclohexylcarboxylate, bis ((3,4-epoxycyclohexyl) methyl) adipate, epoxycyclohexane, 2-(3,4-epoxycyclohexane) ethyltrimethoxysilane, 3,4-epoxycyclohexylmethyl methacrylate, 3,4-epoxycyclohexyl methacrylate, 1,2-epoxy-4-vinylcyclohexane, 4-vinyl-1-cyclohexene diepoxide, bicyclononadiene diepoxide, 3,4-epoxycyclohexane carboxylate, a polymerization product of 3,4-epoxycyclohexylmethyl-3'4'-epoxycyclohexylformate and caprolactone, 4-methyl-1,2-epoxycyclohexane, 2,2-bis (3,3'-epoxycyclohexyl) propane and 2-(3,4-epoxycyclohexane) ethyltrimethoxysilane.

The above-mentioned hydrogenated epoxy compound is preferably a compound having a glycidyl ether group directly or indirectly bonded to a saturated aliphatic cyclic hydrocarbon skeleton, and a polyfunctional glycidyl ether compound is applicable. Such hydrogenated epoxy compounds are preferably completely or partially hydrogenated aromatic epoxy compounds, more preferably hydrogenated aromatic glycidyl ether compounds, still more preferably hydrogenated aromatic multifunctional glycidyl ether compounds. In particular, it can be selected from hydrogenated bisphenol A type epoxy compounds, hydrogenated bisphenol S type epoxy compounds, hydrogenated bisphenol F type epoxy compounds and the like. More preferably it may be hydrogenated bisphenol A type epoxy compounds and hydrogenated bisphenol F type epoxy compounds.

The above-mentioned aromatic epoxy compound is a compound having an aromatic ring and an epoxy group in the molecule. The aromatic epoxy compound can be an epoxy compound having an aromatic ring conjugate system such as a bisphenol skeleton, a fluorene skeleton, a biphenyl skeleton, a naphthalene ring, and an anthracene ring. Wherein, in order to achieve a higher refractive index, the aromatic epoxy compound is preferably a compound having a bisphenol skeleton and/or a fluorene skeleton, more preferably a compound having a fluorene skeleton, whereby the refractive index can be more remarkably improved, and the demoldability can be further improved. In addition, the aromatic epoxy compound is preferably a compound with the epoxy group being a glycidyl group, more preferably a compound with the epoxy group being a glycidyl ether group (i.e., an aromatic glycidyl ether compound). In addition, it is applicable to use a bromide of an aromatic epoxy compound because a higher refractive index can also be achieved, but since the Abbe number is slightly increased, it is preferably used as appropriate according to the application.

Preferred examples of the above-mentioned aromatic epoxy compound include a bisphenol A type epoxy compound, a bisphenol F type epoxy compound, a fluorene type epoxy compound, an aromatic epoxy compound having a bromine substituent and the like. Wherein, a bisphenol A type epoxy compound and a fluorene type epoxy compound are more preferable.

The above-mentioned aromatic glycidyl ether compound can be Epi-bis type glycidyl ether type epoxy resin, high molecular weight Epi-bis type glycidyl ether type epoxy resin, novolak, aralkyl type glycidyl ether type epoxy resin and the like.

The Epi-bis type glycidyl ether type epoxy resin can be a resin obtained by a condensation reaction of bisphenols such as bisphenol A, bisphenol F, bisphenol S, and fluorene bisphenol the like with epoxyhalopropane.

The high molecular weight Epi-bis type glycidyl ether type epoxy resin can be a resin obtained by an addition reaction of the above-mentioned Epi-bis type glycidyl ether type epoxy resin with bisphenols such as bisphenol A, bisphenol F, bisphenol S, and fluorene bisphenol, etc.

Preferred examples of the above-mentioned aromatic glycidyl ether compound include, but are not limited to: bisphenol A type compounds such as 828EL, 1003, and 1007 produced by Japanese Epoxy Manufacturers, and fluorene type compounds such as ONCOATEX-1020, ONCOATEX-1010, OGSOLEG-210, and OGSOLLPG produced by OSAKAGAS CHEMICALS. Wherein, OGSOLEG-210 is particularly preferred.

The above-mentioned aliphatic epoxy compound is a compound having an aliphatic epoxy group, such as an aliphatic glycidyl ether type epoxy resin. Preferred examples of the aliphatic glycidylether type epoxy resin include, but are not limited to, a resin obtained by a condensation reaction of a polyhydroxy compound with epoxy halopropane, wherein the polyhydroxy compound is selected from the group consisting of ethylene glycol, diethylene glycol, triethylene glycol, tetraethylene glycol, polyethylene glycol, propylene glycol, dipropylene glycol, tripropylene glycol, tetrapropylene glycol, polypropylene glycol, glycerol, diglycerol, tetraglycerol, polyglycerol, trimethylolpropane and its polymers, pentaerythritol and its polymers, mono/polysaccharides (e.g., glucose, fructose, lactose, maltose, etc.) and the like. Wherein, an aliphatic glycidyl ether type epoxy resin having a propylene glycol skeleton, an alkylene skeleton, and an alkylene oxide skeleton in the central skeleton is more applicable.

Examples of the above-mentioned vinyl ether compounds include, but are not limited to: aryl vinyl ethers such as phenyl vinyl ethers; alkyl vinyl ethers such as n-butyl vinyl ether and n-octyl vinyl ether and the like; cycloalkyl vinyl ethers such as cyclohexyl vinyl ethers; hydroxyl-containing vinyl ethers such as 2-hydroxyethyl vinyl ether, diethylene glycol monovinyl ether, and 2-hydroxybutyl vinyl ether and the like; multifunctional vinyl ethers such as hydroquinone divinyl ether, 1,4-butanediol divinyl ether, cyclohexane divinyl ether, cyclohexane dimethanol divinyl ether, ethylene glycol divinyl ether, diethylene glycol divinyl ether, and triethylene glycol divinyl ether and the like.

In addition to the above-mentioned compounds, compounds having different classes of cationic polymerizable groups within the molecule can also be used as the cationic polymerizable compounds. For example, those compounds described in Japanese No. 2009-242242 can be used as examples having both an epoxy group (e.g., an alicyclic epoxy group) and a vinyl ether group in the molecule; those compounds described in Japanese No. 2008-266308 can be used as examples having both oxetanyl and vinyl ether groups in the molecule.

A content of the component cationic polymerizable compound in the gravure ink can be appropriately adjusted according to the type and performance requirements of the substrate, preferably from 30% to 80% by mass, more preferably from 40% to 70% by mass. Wherein a mass ratio of the oxetane compounds to the epoxy compounds is preferably (2-5):1, more preferably (2-4):1.

<Free Radical Polymerizable Compound>

There is no particular limitation on the component radical polymerizable compound, as long as it is a compound that can undergo radical polymerization, for example, including but not limited to: compounds having free radical polymerizable groups such as (meth) acryloyl, (meth) acryloyloxy, (meth) acrylamido, vinyl aryl, vinyl ether, and vinyloxycarbonyl.

Examples of (meth) acryloyl compounds include: 1-buten-3-one, 1-penten-3-one, 1-hexen-3-one, 4-phenyl-1-buten-3-one, 5-phenyl-1-penten-3-one, derivatives thereof and the like.

Examples of (meth) acryloyloxy include: methyl (meth) acrylate, ethyl (meth) acrylate, n-butyl (meth) acrylate, isobutyl (meth) acrylate, tert-butyl (meth) acrylate, 2-ethylhexyl (meth) acrylate, isodecyl (meth) acrylate, n-dodecyl (meth) acrylate, n-octadecyl (meth) acrylate, n-butoxyethyl (meth) acrylate, butoxydiethylene glycol (meth) acrylate, methoxytriethylene glycol (meth) acrylate, methoxypolyethylene glycol (meth) acrylate, cyclohexyl (meth)acrylate, n-hexyl (meth)acrylate, tetrahydrofurfuryl (meth) acrylate, benzyl (meth) acrylate, phenoxyethyl (meth) acrylate, isobornyl (meth) acrylate, 2-hydroxyethyl (meth) acrylate, 2-hydroxypropyl (meth) acrylate, 2-hydroxybutyl (meth) acrylate, diethylaminoethyl (meth) acrylate, diethylaminoethyl (meth) acrylate, methacrylic acid, 2-methacryloyloxyethyl succinic acid, 2-methacryloyloxyethylhexahydrophthalic acid, 2-methacryloyloxyethyl-2-hydroxypropyl phthalate, glycidyl (meth) acrylate, 2-(phosphonooxy) ethyl 2-methyl-2-acrylate, ethylene glycol di (meth) acrylate, diethylene glycol di (meth) acrylate, triethylene glycol di (meth) acrylate, 1,4-butylene glycol di (meth) acrylate, neopentyl glycol di (meth) acrylate, 1,6-hexanediol di (meth) acrylate, 1,9-nonanediol di (meth) acrylate, 1,10-decanediol di (meth) acrylate, glycerol di (meth) acrylate, 2-hydroxy 3-acryloyloxypropyl (meth) acrylate, dimethyloltricyclodecane di (meth) acrylate, trifluoroethyl (meth) acrylate, perfluorooctylethyl (meth) acrylate, isoamyl (meth) acrylate, isotetradecyl (meth)acrylate, γ-(meth) acryloyloxypropyl trimethoxysilane, 2-(meth) acryloyloxyethyl isocyanate, 1,1-bis (acryloyloxy) ethyl isocyanate, 2-(2-methacryloyloxyethoxy) ethyl isocyanate, vinyltrimethoxysilane, vinyltriethoxysilane, 3-(meth) acryloyloxypropyltriethoxysilane, etc., and their derivatives and the like.

Examples of (meth) acrylamido compounds include: 4-morpholinyl acrylic acid, acryloylmorpholine, N,N-dimethylacrylamide, N,N-diethylacrylamide, N-methacrylamide, N-ethylacrylamide, N-propylacrylamide, N-isopropylacrylamide, N-butylacrylamide, N-n-butoxymethacrylamide, N-hexylacrylamide, N-octylacrylamide, etc., derivatives thereof and the like.

As examples of the vinyl aryl and vinyl ether compound, the same examples as those listed in the above cationic polymerizable compound can be given.

Ethyleneoxycarbonyl compounds include: isopropenyl carboxylate, isopropenyl acetate, isopropenyl propionate, isopropenyl butyrate, isopropenyl isobutyrate, isopropenyl hexanoate, isopropenyl pentanoate, isopropenyl isovalerate, isopropenyl lactate, vinyl acetate, vinyl propionate, vinyl butyrate, vinyl hexanoate, vinyl octanoate, vinyl laurate, vinyl myristate, vinyl palmitate, vinyl stearate, vinyl cyclohexanecarboxylate, vinyl trimethylacetate, vinyl octanoate, vinyl monochloroacetate, divinyl adipate, vinyl methacrylate, vinyl crotonate, vinyl sorbate, vinyl benzoate, vinyl cinnamate, etc., and derivatives thereof.

A mass ratio of the component radically polymerizable compound in the radiation curable gravure ink composition of a third typical embodiment is from 10% to 50%, preferably from 15% to 30%.

The cationic photoinitiator and the free radical photoinitiator according to the third typical embodiment can employ the aforementioned cationic photoinitiator and free radical photoinitiator, which will not be described in detail herein. In terms of mass percentage, a content of the cationic photoinitiator in the gravure ink composition of the third typical embodiment is from 1% to 20%, preferably from 3% to 10%; in terms of mass percentage, a content of the component free radical photoinitiator in the gravure ink composition of the third typical embodiment is from 1% to 20%, preferably from 3% to 10%.

<Filler>

The classes of the component filers are not particularly limited, and those conventionally used in gravure inks can be used. Typically, the filer is selected from one or a mixture of two of nano calcium carbonate and silica.

In a first typical embodiment of the present disclosure, in terms of mass percentage, a content of the component filer in the gravure ink is from 0% to 30%, preferably from 0% to 20%. In a second typical embodiment of the present disclosure, in terms of mass percentage, a content of the component filler in the gravure ink is from 0% to 20%, preferably from 0% to 10%. In a third typical embodiment of the present disclosure, in terms of mass percentage, a content of the component filer in the gravure ink is from 0% to 20%, preferably from 0% to 10%.

<Other Optional Components>

In addition to the above-mentioned components, the gravure ink of the present disclosure can optionally be added with organic and/or inorganic auxiliaries commonly used in the art according to the requirements of the product application environment, including, but not limited to, leveling agents, dispersing agents, curing agents, surfactants, defoaming agents, storage enhancers, and the like, which would be readily determined by those skilled in the art. In terms of mass percentage, a total content of auxiliary is from 0% to 5%, preferably from 0% to 3%.

In addition, a sensitizer can be added into the system for the purpose of improving the sensitivity of the gravure ink. Especially when the radiation source is an LED, preferably a sensitizer is added to the gravure ink. The classes of sensitizer can be a pyrazoline compound, an acridine compound, an anthracene compound, a coumarin compound, a tertiary amine compound and the like. As the anthracene sensitizer compounds, compounds having the structure represented by the following Formulae (III) and/or (IV) are particularly preferred:

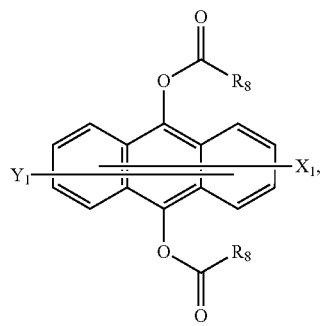
(III)

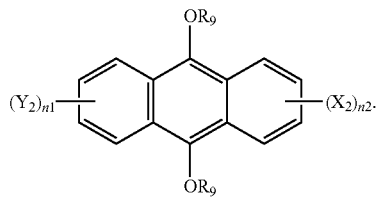
(IV)

In general Formula (III), $R_8$ represents $C_1$-$C_{12}$ alkyl, $C_1$-$C_{12}$ aryl, $C_1$-$C_8$ alkoxy or aryloxy, $C_3$-$C_{12}$ cycloalkyl, $C_4$-$C_{12}$ alkylcycloalkyl or cycloalkylalkyl, wherein one or more of these groups can be substituted by halogen and hydroxy; $X_1$ and $Y_1$ each independently represent hydrogen, alkyl, alkoxy, halogen atom, nitro, sulfonic acid, hydroxyl, and amino.

In general Formula (IV): $R_9$ represents $C_1$-$C_{12}$ alkyl, $C_1$-$C_{12}$ aryl, $C_1$-$C_8$ alkoxy or aryloxy $C_3$-$C_{12}$ cycloakyl. $C_4$-$C_{12}$ alkylcycloalkyl or cycloalkylalkyl, wherein one or more of these groups can be substituted by halogen and hydroxy; n1 and n2 each independently represent an integer of 0 to 4, $X_2$ and $Y_2$ can be the same or different and each independently represent hydrogen, alkyl, alkoxy, halogen atom, nitro, sulfonic acid, hydroxyl, and amino, and when n1 and n2 represent 2 or more, $X_2$ and $Y_2$ can be the same or different from each other.

Exemplarily, the anthracene compounds can be one or more combinations of the following compounds:

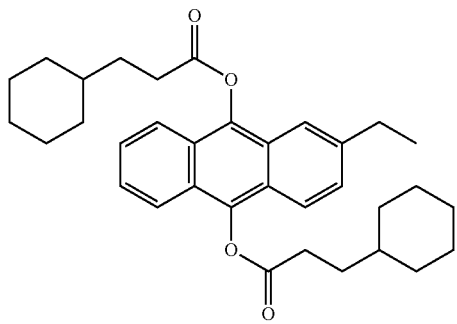

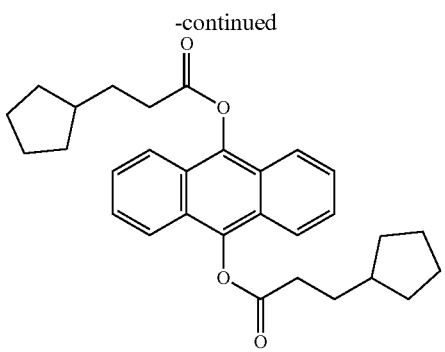

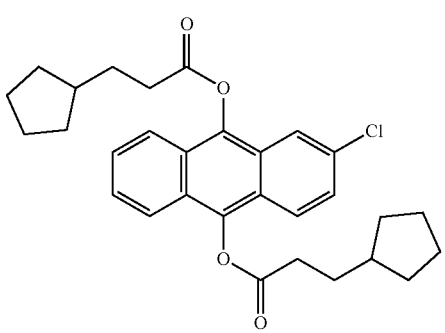

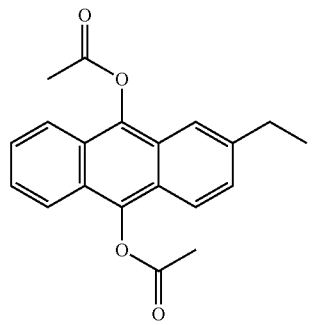

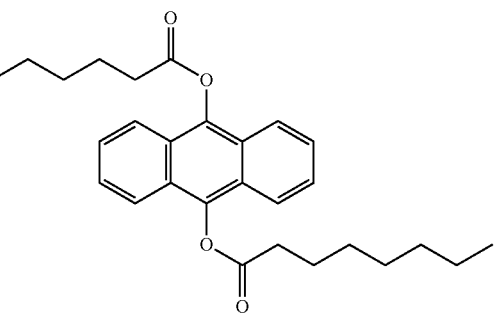

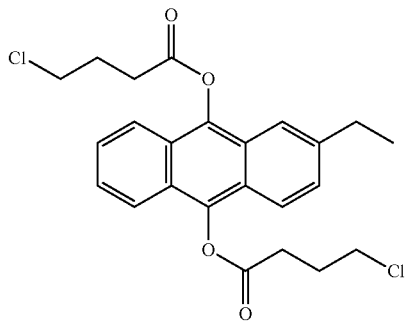

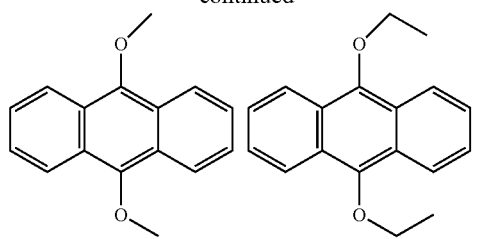

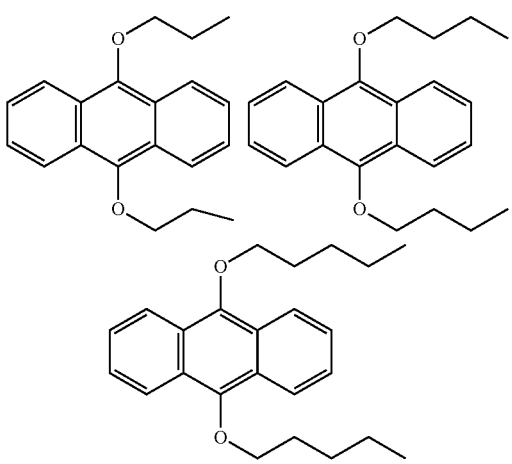

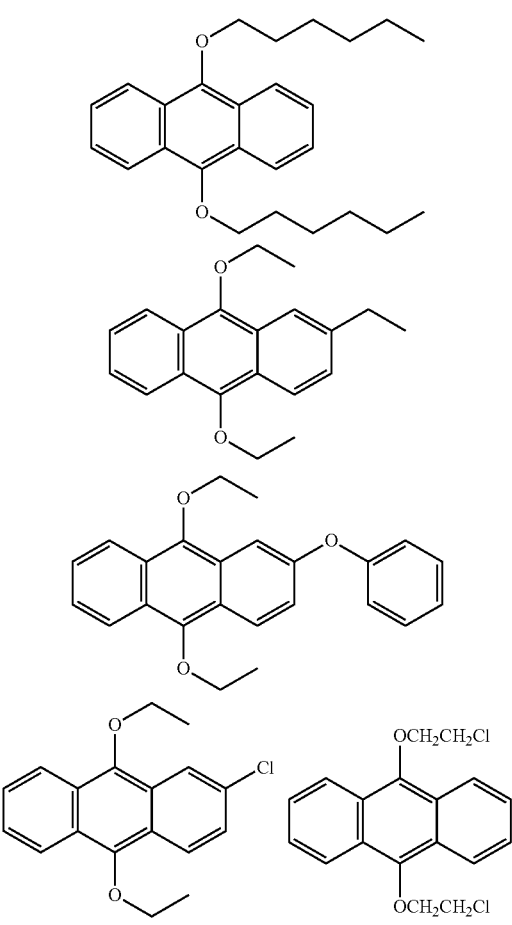

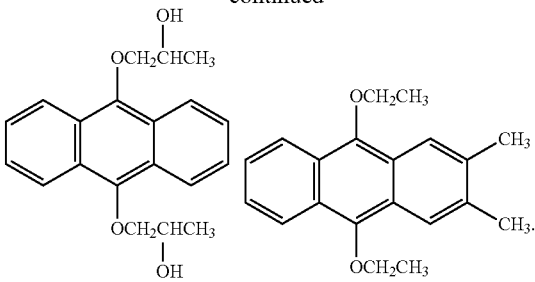

A mass percentage content of the sensitizer in the gravure ink can be from 0% to 5%, preferably from 0% to 2%.

Under the energy radiation of ultraviolet rays, visible rays, infrared rays, electron beams, lasers and the like, the gravure ink provided by the disclosure undergoes polymerization reaction, thereby achieving rapid drying. As the energy-imparting light source, preferably a dominant wavelength is in a range of from 250 nm to 450 nm, and examples include various kinds of light sources such as an ultra-high pressure mercury lamp, a high pressure mercury lamp, a medium pressure mercury lamp, a mercury xenon lamp, a metal halide lamp, a high-power metal halide lamp, a xenon lamp, a pulse-emitting xenon lamp, a deuterium lamp, a LED lamp, a fluorescent lamp, a Nd—YAG triple-frequency laser, a He—Cd laser, a nitrogen laser, a Xe—Cl excimer laser, a Xe—F excimer laser, and a semiconductor excitation solid laser.

The radiation curable gravure ink of the present disclosure can be obtained by uniformly blending the ingredients of each component, and the specific preparation process can refer to those conventional methods in the field of radiation curable compositions. Typically, the preparation process comprises: proportioning, pre-dispersing, grinding, filtering (through a filter screen with a specified size to obtain a product with a required particle size) under the conditions of constant temperature and humidity and avoiding a radiation light source; if the pigment needs to be modified, performing pigment modification treatment before proportioning.

Without any volatile organic solvents, the radiation curable gravure ink according to the first typical embodiment of the present disclosure has the advantages of low viscosity, good fluidity, excellent printability and transfer property on a printing machine, being able to realize high-speed printing, and being applicable for various substrates, particularly the carrier surfaces such as paper, plastic, and film. The ink has the advantages of high curing speed, good coating adhesion fastness after curing, good appearance of prints, no odor and strong market competitiveness.

Without any volatile organic solvents, the radiation curable gravure ink according to the second typical embodiment of the present disclosure has the advantages of low viscosity, good fluidity, excellent printability and transfer property on a printing machine, being able to realize high-speed printing, and being applicable for various substrates, particularly the carrier surfaces such as paper, plastic, and film. The ink has the advantages of high curing speed, good coating adhesion fastness alter curing, excellent abrasion resistance, good appearance of prints, no odor and strong market competitiveness.

Without any volatile organic solvents, the radiation curable gravure ink according to the third typical embodiment of the present disclosure has the advantages of low viscosity, good fluidity, excellent printability and transfer property on a printing machine, being able to realize high-speed printing, being applicable for various substrates, particularly the carrier surfaces such as paper, plastic, and film, good coating adhesion fastness after curing, excellent abrasion resistance, good appearance of prints, no odor and strong market competitiveness.

Hereinafter, the present disclosure will be described in further detail with reference to specific Embodiments, but should not be construed as limiting the scope of the present disclosure.

Corresponding to the technical scheme of the aforementioned first typical embodiment, the Embodiments are as follows:

1. Preparation of Radiation Curable Gravure Ink

According to the formulation shown in the Embodiments 1-11 in Table 1, the raw materials were uniformly stirred for 1 h by using a high-speed stirrer under the condition of a yellow light lamp, then ground by using a sanding machine, and then filtered through a filter screen with a particle size of 1 μm to obtain the radiation cured gravure ink.

Unless otherwise specified, the amounts described in the Embodiments are parts by weight, wherein component A refers to cationic polymerizable compounds, component B refers to cationic photoinitiators, component C refers to pigments, and component D refers to filers.

TABLE 1

| Components | | 1 | 2 | 3 | 4 | 5 | 6 | 7 | 8 | 9 | 10 | 11 |
|---|---|---|---|---|---|---|---|---|---|---|---|---|
| A | A1-1 | 40 | | | | 30 | | | | 20 | | |
|  | A1-2 | | 40 | 20 | | | | | 20 | | | |
|  | A1-3 | | | 25 | | | 20 | | | | | 30 |
|  | A1-4 | | | | 45 | | 20 | 30 | | | | |
|  | A1-5 | | | | | 20 | | | | | | |
|  | A1-6 | | | | | | 30 | | | | | |
|  | A1-7 | | | | | | | 35 | | | | |
|  | A1-8 | | | | | | | | 25 | | | 30 |
|  | A2-1 | 15 | | 17 | | 20 | | 25 | | 20 | | |
|  | A2-2 | | 15 | | 15 | | 20 | | 30 | | 25 | 30 |
| B | B-1 | 12 | | 10 | | 10 | | | | 15 | 20 | |
|  | B-2 | | 15 | | | | 10 | | 8 | 10 | | 3 |
|  | B-3 | | | | 12 | | | 8 | | | | |
| C | Red pigment | 10 | 12 | | | | | | | 20 | | |
|  | Blue pigment | | | 10 | 10 | | | | | | | 5 |
|  | Yellow pigment | | | | | 8 | 8 | | | | 20 | |
|  | Black pigment | | | | | | | 5 | 5 | | | |
| D | Filler | 20 | 15 | 15 | 15 | 10 | 10 | 5 | | 11 | 15 | |
| Other components | Sensitizer-1 | 1 | 1 | | | 1 | | 1 | | | | 1 |
|  | Sensitizer-2 | | | 1 | 1 | | | | | 2 | | |
|  | Sensitizer-3 | | | | | | | 1 | 1 | | | |
|  | Leveling agent | 1 | 1 | 1 | 1 | 0.5 | 0.5 | 0.5 | 0.5 | 1 | | 0.5 |
|  | Polymerization inhibitor | 1 | 1 | 1 | 1 | 0.5 | 0.5 | 0.5 | 0.5 | 1 | | 0.5 |
| Total | | 100 | 100 | 100 | 100 | 100 | 100 | 100 | 100 | 100 | 100 | 100 |

In Table 1, the specific meanings of the components are as follows:
A1-1: the aforementioned compound 1; A1-2: the aforementioned compound 2; A1-3; the aforementioned compound 3; A1-4: the aforementioned compound 4; A1-5: the aforementioned compound 5; A1-6; the aforementioned compound 6; A1-7; the aforementioned compound 9; A1-8: the aforementioned compound 10;
A2-1: 3,4-epoxycyclohexylmethyl-3',4'-epoxycyclohexyl carboxylate, Jiangsu Tetra New Material Technoology Co., Ltd.; A2-2: bis((3,4-epoxycyclohexyl)methyl)adipate, Jiangsu Tetra New Material Technology Co., Ltd.;
B-1: a mixed salt of bis(4-diphenyl sulfonium)phenyl)sulfide-bis(hexafluorophosphate) and 4-(phenylthio)phenyl diphenyl sulfide hexafluorophosphate, Changzhou Tronly Chemical Engineereing Co., Ltd.;
B-2: 4,4'-dimethylphenyl iodonium hexafluorophosphate, Changzhou Tronly Chemical Engineereing Co., Ltd.;
B-3:

Red Pigment: Irgalite 2BP, BASF; blue pigment: Heliogen K 7090, BASF;
Yellow pigment: Paliotol K 0961 HD, BASF; Black pigment: carbon black MA-11, Mitsubishi Chemical Holdings;
Filler: silica A-200, Evonik Industries AG;
Sensitizer-1: 9,10-dibutyl anthracene ether; sensitizer-2: 2-ethylanthracene-9,10-diethyl ester;
Sensitizer-3:

Leveling agent: BYK 333, Evonik Industries AG;

Polymerization inhibitor: hindered nitroxyl stabilizer

Red pigment: Irgalite 2 BP, BASF, blue pigment: Heliogen K7090, BASF,
Yellow pigment: Paliotol K 0961 HD, BASF; Black pigment: carbon black MA-11, Mitsubishi Chemical Holdings;
Filler silica A-200, Evonik Industries AG;
Sensitizer-1: 9,10-dibutyl anthracene ether; sensitizer-2: 2-ethylanthracene-9,10-diethyl ester;

2. Test and Evaluation for Ink Performance

A Songde solvent-free gravure press (Model: A380) was used for printing, wherein a LED lamp with a wavelength of 395 nm is additionally arranged on the machine to serve as a radiation light source. The samples of Embodiments 1-11 were tested and evaluated for performance according to QBT 1046-2012 Gravure Surface Ink for Plastic Film Industry Standard.

(1) Test for Viscosity of Ink

For solvent-free gravure inks, the viscosity directly affected the transfer performance of the ink and thus affected the appearance of the prints. Through the machine test on a Songde solvent-free gravure press (Model: A380), it was found that the viscosity of the ink was particularly applicable at 10-20 s.

With reference to GB/T 13217.4-2008 Test method for viscosity of liquid ink, the ink of Embodiments 1-11 was tested for viscosity, in unit of s.

(2) Test for Drying Rate of Ink

The ink to be tested was transferred to the PET film by A380 gravure press, with a thickness of about 10 μm. It was illuminated by an LED light source with a wavelength of 395 nm and an intensity of 15 w/cm². The surface curing was evaluated with reference to the finger touch method in GB/T 1728-1979 Methods of test for drying time of coatings of paints and putties, i.e. the coating was touched gently with a finger to confirm that the surface was dry, smooth, tack-free, and no fingerprints.

The drying rate was expressed as the maximum linear speed to achieve the surface drying effect, in units of m/min.

(3) Test for Storage Stability of Ink

With reference to GB-T 6753.3-1986 Methods of test for storage stability of ink, the storage stability of the ink to be tested was measured. The specific method included the following steps: the ink was placed in a 50° C. oven and the viscosity of the ink was measured 7 days later. The evaluation grades are as follows:

○: a viscosity increase ratio of below 5%; ⊚⊚: a viscosity increase ratio of greater than 5% and less than 10%;

•: a viscosity increase ratio of greater than 10%. The evaluation results are summarized in Table 2.

TABLE 2

| Performance test | Embodiments | | | | | | | | | | |
|---|---|---|---|---|---|---|---|---|---|---|---|
| | 1 | 2 | 3 | 4 | 5 | 6 | 7 | 8 | 9 | 10 | 11 |
| Viscosity | 17 | 18 | 15 | 14 | 15 | 13 | 14 | 12 | 15 | 14 | 14 |
| Drying rate | 260 | 280 | 245 | 260 | 255 | 270 | 240 | 255 | 255 | 245 | 250 |
| Storage stability | ○ | ○ | ○ | ○ | ○ | ○ | ○ | ○ | ○ | ○ | ○ |

It can be seen from the test results in the above table a the gravure inks of Embodiments 1-11 using the formulation of the present disclosure have low viscosity and good storage stability, and the radiation curing speeds are all above 240 m/min, which obviously exceed that of the prior art that is no more than 200 n/min, and production efficiency is greatly improved.

3. Test and Evaluation for Coating Performance

Under the condition of the slowest linear speed (240 m/min) that ensured that the gravure ink could be completely cured and dried, the gravure inks in Embodiments 1-11 were printed on a PET film substrate with a thickness of about 10 μm. After standing for 24 h, the cured coatings were tested and evaluated for physical properties including adhesion fastness, appearance of prints and odor residue.

(1) Test for Adhesion Fastness

The test was carried out according to the GB/T 13217.7-91 gravure ink testing standard, and the specific method was as follows: under the conditions of 25±1° C. and humidity 65%±5%, the adhesive tape conforming to the standard GB 7707 was stuck on the printing surface of the ink for rolling back and forth 3 times on the tape roller. After standing for 5 min, the sample was clamped on a plate A, the exposed adhesive tape was fixed on a plate B, the roller was then started up, with the plate A rotating at a speed of from 0.6 m/s to 1.0 m/s to uncover the adhesive tape, and covering the uncovered part with semitransparent millimeter squared paper with a width of 20 mm. The number of square lattices occupied by the ink layer and the number of square lattices occupied by the uncovered ink layer were counted respectively, and adhesion fastness was calculated according to the following Formula A (%)=[A1/(A1+A2)]×100%; in the Formula, A represents ink adhesion fastness, A1 represents the number of square lattices of the ink layer, and A2 represents the number of square lattices of the uncovered ink layer. A greater than or equal to 90 was considered to meet performance metrics.

(2) Test for Appearance of the Prints

The test was carried out according to GB/T 7707-2008 "The intaglio prints for decorating", and the specific method was as follows: the prints were identified by visual inspection under the observation light source conforming to the CY/T 3 protocol. The prints that were tidy, free of obvious ink stains, tailing, incompleteness, and cutting edges, smooth in edge, uniform in ink color, free of obvious water lines, free of obvious deformation and defects, were considered to be qualified.

(3) Test for Odor Residue

The cured products were put into a sealed bag immediately, sealed for 24 h at room temperature, and the judgment was carried out by artificial smell after opening the mouth of the bag. The evaluation grades are as follows:

○: no obvious smell, x: pungent smell. The evaluation results are summarized in Table 3.

TABLE 3

| Performance test | Embodiments | | | | | | | | | | |
|---|---|---|---|---|---|---|---|---|---|---|---|
| | 1 | 2 | 3 | 4 | 5 | 6 | 7 | 8 | 9 | 10 | 11 |
| Adhesion Fastness A % | 92 | 94 | 95 | 95 | 98 | 97 | 96 | 96 | 94 | 90 | 92 |
| Appearance | Qualified | Qualified | Qualified | Qualified | Qualified | Qualified | Qualified | Qualified | Qualified | Qualified | Qualified |
| Odor | ○ | ○ | ○ | ○ | ○ | ○ | ○ | ○ | ○ | ○ | ○ |

It can be seen from the evaluation results in Table 3 that ater the gravure ink of the present disclosure is cured, the coating adhesion is good, the prints pattern is clean, the edges are smooth, the ink color is uniform, and the product has no obvious odor.

In addition, the initiators in the above-mentioned formulation of Embodiment 1 and Embodiment 2 were replaced with

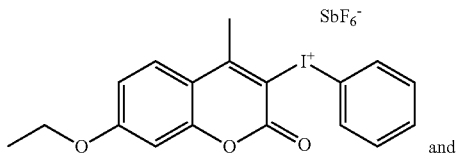

and

-continued

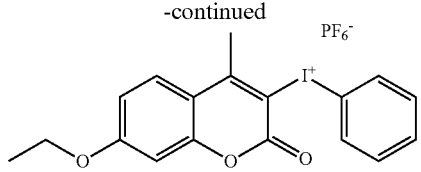

respectively, and the same technical effects can be obtained under the same preparation and test conditions; the initiators in the above-mentioned formulation of Embodiment 5 and Embodiment 6 were replaced with

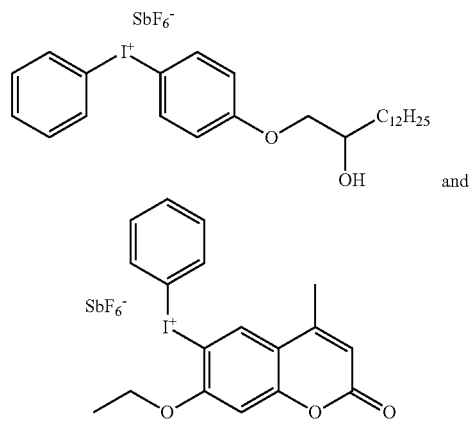

respectively, and the same technical effect can be obtained under the same preparation and test conditions.

4. Further Test and Evaluation for Performance

The radiation curable gravure ink was applied to paper and plastic substrates respectively, and the application performance of the radiation curable gravure ink was further verified.

(1) Paper Substrate

The performance of the radiation curable gravure ink provided by the disclosure applied to paper substrates was evaluated according to the requirements of the substrate and the testing method in the evaluation standard GB/T 26461-2011 Gravure ink for paper.

The ink composition was prepared according to the formulation in Table 4, and the ink was printed on the offset paper conforming to GB/T 10335.1 by a Songde solvent-free gravure press (Model: A380), with a printing speed of 240 m/min, and a high-pressure mercury lamp (RW-UV.70201) was used for radiation curing with a radiation energy of about 200 mj/cm² to obtain a printed pattern with a thickness of about 10 μm. Then adhesion fastness, appearance of prints and odor were evaluated with reference to the evaluation method in the previous section. The test results are summarized in Table 4.

TABLE 4

| Formula | Compound 7 50 | A2-1 20 | B-1 10 | Black pigment 10 | Filler 8 | Levelling agent 1 | Polymerization inhibitor 1 |
|---|---|---|---|---|---|---|---|
| Test items | Test results | | | | | | |
| Adhesion Fastness A % | 95 | | | | | | |
| Appearance Odor | Qualified ○ | | | | | | |

(2) Plastic Film Substrate

The performance of the radiation curable gravure ink provided by the disclosure applied to different kinds of plastic film substrates was evaluated according to the requirements of the substrate and the testing method in the evaluation standard GB/T 1046-2012 "Gravure surface ink for plastic film".

The ink composition was prepared according to the formulation in Table 5, and the ink was printed on the PET, PVC, PP and PE substrates by a Songde solvent-free gravure press (Model: A380) respectively, with a printing speed of 240 m/min, and a high-pressure mercury lamp (RW-UV.70201) was used for radiation curing with a radiation energy of about 200 mj/cm² to obtain a printed pattern with a thickness of about 10 μm. Then adhesion fastness, appearance of prints and odor were evaluated with reference to the evaluation method in the previous section. The test results are summarized in Table 5.

TABLE 5

| Formula | Compound 10 50 | A2-2 25 | B-3 10 | Black pigment 8 | Filler 5 | Levelling agent 1 | Polymerization inhibitor 1 |
|---|---|---|---|---|---|---|---|
| Test items | Test results | | | | | | |
| Substrates | PET | PVC | | PP | | PE | |
| Adhesion Fastness A % | 97 | 95 | | 92 | | 93 | |
| Appearance Odor | Qualified ○ | Qualified ○ | | Qualified ○ | | Qualified ○ | |

It can be seen from the test results in Tables 4 and 5 that the radiation curable gravure ink of the present disclosure can be applied to different substrate surfaces and has excellent application properties.

In addition, the same technical effect can be obtained by replacing the initiator in the above-mentioned formulation of Table 5 with

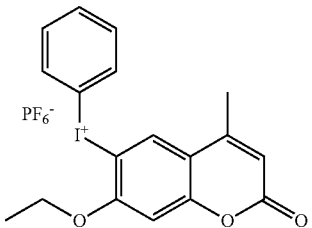

under the same preparation and test conditions.

Corresponding to the technical scheme of the aforementioned second typical embodiment, the Embodiments are as follows:

1. Preparation of Radiation Curable Gravure Ink Composition

According to the formulation shown in the Embodiments 12-26 in Table 6, the raw materials were uniformly stirred for 1 h by using a high-speed stirrer under the condition of a yellow light lamp, then ground by using a sanding machine, and then filtered through a filter screen with a particle size of 1 μm to obtain the radiation cured gravure ink.

Unless otherwise specified, the amounts described in the Embodiments are parts by weight. Wherein, component A refers to cationic polymerizable compounds, component B refers to free radical polymerizable compounds, component C refers to cationic photoinitiators, component D refers to free radical photoinitiators, component E refers to pigments, and component F refers to filler.

TABLE 6

| Components | | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|
| A | A1-1 | 32 | | | | | | | | | | 15 | | | | |
| | A1-2 | | 20 | | | | | | | | | | | 40 | | |
| | A1-3 | | | 25 | | | | | | | | | 40 | | | |
| | A1-4 | | 10 | | 35 | | | | | | | | | 20 | 15 | 35 |
| | A1-5 | | | 10 | | 36 | | | | | | | 20 | | | |
| | A1-6 | | | | | | 36 | | | | | | | | | |
| | A1-7 | | | | | | | 40 | | | | | | | | |
| | A1-8 | | | | | | | | 40 | | | | | | | |
| | A1-9 | | | | | | | | | 45 | | | | | | |
| | A1-10 | | | | | | | | | | 45 | | | | | |
| | A2-1 | 12 | | 10 | | 9 | | 15 | | 15 | | 15 | | 20 | | |
| | A2-2 | | 10 | | 10 | | 9 | | 15 | | 15 | | 10 | | 15 | 10 |
| B | B-1 | 30 | | 20 | | 25 | | 20 | | 15 | | 50 | | 10 | | |
| | B-2 | | 30 | | 20 | | 25 | | 20 | | 15 | | 20 | | 15 | 20 |
| C | C-1 | 8 | | 5 | | 5 | | 5 | | | | 10 | | 1 | 20 | |
| | C-2 | | 8 | | | | 5 | | 5 | | 6 | | 3 | | | |
| | C-3 | | | | 5 | | | | | 6 | | | | | | 8 |
| D | D-1 | 8 | | 5 | | 5 | | 5 | | 6 | | 3 | | 5 | 20 | 10 |
| | D-2 | | 8 | | 5 | | 5 | | 5 | | 6 | | 5 | | | |
| E | Red pigment | | | | | | | 8 | 8 | | | 3 | | 2 | | |
| | Blue pigment | | | | | 8 | 8 | | | | | | 1 | | 10 | 10 |
| | Yellow pigment | | | 12 | 12 | | | | | | | | | | | |
| | Black pigment | 8 | 8 | | | | | | | 5 | 5 | | | | | |
| F | Filler | | 4 | 10 | 10 | 9 | 9 | 5 | 5 | 5 | 5 | 3 | 1 | 2 | 4 | 5 |
| Other components | Sensitizer | 1 | 1 | 1 | 1 | 1 | 1 | 1 | 1 | 1 | 1 | 1 | 1 | | 1 | 1 |
| | Leveling agent | 0.5 | 0.5 | 1 | 1 | 1 | 1 | 0.5 | 0.5 | 1 | 1 | | | | | 1 |
| | Polymerization inhibitor | 0.5 | 0.5 | 1 | 1 | 1 | 1 | 0.5 | 0.5 | 1 | 1 | | | | | |
| | Total | 100 | 100 | 100 | 100 | 100 | 100 | 100 | 100 | 100 | 100 | 100 | 100 | 100 | 100 | 100 |

In Table 6, the specific meanings of the components are as follows:

A1-1: the aforementioned compound 1; A1-2: the aforementioned compound 2; A1-3: the aforementioned compound 3; A1-4: the aforementioned compound 4; A1-5: the aforementioned compound 5; A1-6: the aforementioned compound 6; A1-7: the aforementioned compound 9; A1-10: the aforementioned compound 10;

A2-1: 3,4-epoxycyclohexylmethyl-3',4'-epoxycyclohexyl carboxylate, Jiangsu Tetra New Material Technology Co., Ltd.;

A2-2: bis((3,4-epoxycyclohexyl)methyl)adipate, Jiangsu Tetra New Material Technology Co., Ltd.;

B-1: trimethylolpropane triacrylate, Sartomer;

B-2: tripropylene glycol diacrylate, Sartomer;

C-1: a mixed salt of bis(4-diphenyl sulfonium)phenyl)sulfide-bis(hexafluorophosphate) and 4-(phenylthio)phenyl diphenyl sulfide hexafluorophosphate, Changzhou Tronly Chemical Engineering Co., Ltd.;

C-2: 4,4'-dimethylphenyl iodonium hexafluorophosphate, Changzhou Tronly Chemical Engineering Co., Ltd,;

TABLE 6-continued

| | Embodiments | | | | | | | | | | | | | | |
|---|---|---|---|---|---|---|---|---|---|---|---|---|---|---|---|
| Components | 12 | 13 | 14 | 15 | 16 | 17 | 18 | 19 | 20 | 21 | 22 | 23 | 24 | 25 | 26 |

C-3: 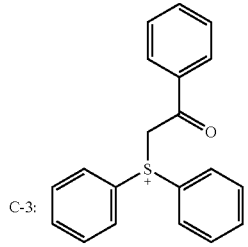

D-1: 1-hydroxycyclohexylphenylmethanone, BASF;
D-2: 2-methyl-1-[4-(methylthio)phenyl]-2-(4-morpholinyl)-1-propanone, BASF;
Red pigment: Irgalite 2 BP, BASF;
Blue pigment: Heliogen K 7090, BASF;
Yellow pigment: Paliotol K 0961 HD, BASF;
Black pigment: carbon black MA-11, Mitsubishi Chemical Holdings;
Filler: silica A-200, Evonik Industries AG;
Sensitizer-1: 9,10-dibutyl anthracene ether;
Sensitizer-2: 2-ethylanthracene-9,10-diethyl ester;

Sensitizer-3: 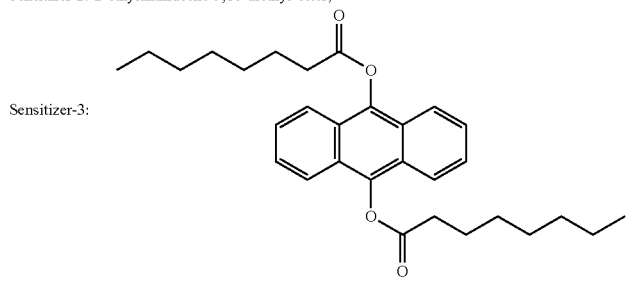

Leveling agent: BYK 333. Evonik Industries AG;

Polymerization inhibitor: hindered nitroxyl stabilizer 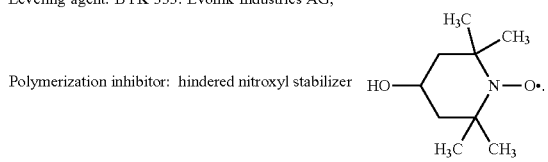

2. Test and Evaluation for Ink Performance

The test and evaluation method is the same as that used in the above-mentioned first typical embodiment.

The evaluation results are summarized in Table 7.

TABLE 7

| Performance | Embodiments | | | | | | | | | | | | | | |
|---|---|---|---|---|---|---|---|---|---|---|---|---|---|---|---|
| test | 12 | 13 | 14 | 15 | 16 | 17 | 18 | 19 | 20 | 21 | 22 | 23 | 24 | 25 | 26 |
| Viscosity | 14 | 13 | 15 | 15 | 15 | 14 | 17 | 16 | 18 | 16 | 15 | 14 | 13 | 16 | 18 |
| Drying rate | 320 | 315 | 285 | 280 | 280 | 270 | 295 | 295 | 285 | 270 | 280 | 270 | 270 | 280 | 280 |
| Storage stability | ○ | ○ | ○ | ○ | ○ | ○ | ○ | ○ | ○ | ○ | ○ | ○ | ○ | ○ | ○ |

It can seen from the test results in the above table that the gravure inks of Embodiments 12-26 using the formulation of the present disclosure have low viscosity and good storage stability, and the radiation curing speeds are all above 270 m/min, which obviously exceed that of the prior art that is no more than 200 m/min, and production efficiency is greatly improved.

3. Test and Evaluation for Coating Performance

The test and evaluation method is the same as that used in the above-mentioned first typical embodiment, wherein test for abrasion resistance is as follows:

The measurement was carried out according to GB/T 1768-2006 "Paints and varnishes—Determination of resistance to abrasion-Rotating abrasive rubber wheel method". Specific implementation methods are as follows:

500 g weight was weighted on a rubber grinding wheel at 23±2° C. and 50±5% relative humidity, then the paint film was rubbed by the rubber grinding wheel fixed on a abrasion tester, and the abrasion resistance of the paint film was expressed by the mass loss of the paint film after 500 cycles of friction in g/500 r.

The abrasive mass below 0.030 g/500 r was considered to be a very good product.

The evaluation results are summarized in Table 8.

TABLE 8

| Performance test | Embodiments | | | | | | | | | | | | | | |
|---|---|---|---|---|---|---|---|---|---|---|---|---|---|---|---|
| | 12 | 13 | 14 | 15 | 16 | 17 | 18 | 19 | 20 | 21 | 22 | 23 | 24 | 25 | 26 |
| Adhesion Fastness A % | 94 | 96 | 97 | 97 | 98 | 95 | 96 | 97 | 98 | 99 | 95 | 94 | 94 | 95 | 95 |
| Abrasion resistance | 0.022 | 0.022 | 0.020 | 0.026 | 0.016 | 0.022 | 0.024 | 0.025 | 0.023 | 0.022 | 0.024 | 0.026 | 0.026 | 0.026 | 0.024 |
| Appearance | Qualified | Qualified | Qualified | Qualified | Qualified | Qualified | Qualified | Qualified | Qualified | Qualified | Qualified | Qualified | Qualified | Qualified | Qualified |
| Odor | ○ | ○ | ○ | ○ | ○ | ○ | ○ | ○ | ○ | ○ | ○ | ○ | ○ | ○ | ○ |

It can be seen from the evaluation results in Table 8 that after the gravure ink of the present disclosure is cured, the coating adhesion is good, the abrasion resistance is excellent, the prints pattern is dean, the edges are smooth, the ink color is uniform, and the product has no obvious odor.

4. Further Test and Evaluation for Performance

The radiation curable gravure ink was applied to paper and plastic substrates respectively, and the application performance was further verified.

(1) Paper Substrate

The performance of the radiation curable gravure ink provided by the disclosure applied to paper substrates was evaluated according to the requirements of the substrate and the testing method in the evaluation standard GB/T 26461-2011 Gravure ink for paper.

The ink composition was prepared according to the formulation in Table 9, and the ink was printed on the offset paper conforming to GB/T 10335.1 by a Songde solvent-free gravure press (Model: A380), with a printing speed of 270 m/min, and a high-pressure mercury lamp (RW-UV70201) was used for radiation curing with a radiation energy of about 200 mj/cm$^2$ to obtain a printed pattern with a thickness of about 10 μm. Then adhesion fastness, appearance of prints and odor were evaluated with reference to the evaluation method in the previous section.

The test results are summarized in Table 9.

TABLE 9

| Formula | A1-3 | A2-1 | B-1 | C-1 | D-1 | Black pigment | Filler | Levelling agent | Polymerization inhibitor |
|---|---|---|---|---|---|---|---|---|---|
| | 30 | 15 | 30 | 5 | 5 | 8 | 6 | 0.5 | 0.5 |
| Test items | Test results | | | | | | | | |
| Adhesion Fastness A % | 97 | | | | | | | | |
| Abrasion resistance | 0.021 | | | | | | | | |
| Appearance | Qualified | | | | | | | | |
| Odor | ○ | | | | | | | | |

(2) Plastic Film Substrate

The performance of the radiation curable gravure ink provided by the disclosure applied to different kinds of plastic film substrates was evaluated according to the requirements of the substrate and the testing method in the evaluation standard GB/T 1046-2012 Gravure surface ink for plastic film.

The ink composition was prepared according to the formulation in Table 10, and the ink was printed on the PET, PVC, PP and PE substrates by a Songde solvent-free gravure press (Model: A380) respectively, with a printing speed of 270 m/min, and a high-pressure mercury lamp (RW-UV.70201) was used for radiation curing with a radiation energy of about 200 ml/cm$^2$ to obtain a printed pattern with a thickness of about 10 μm. Then adhesion fastness, appearance of prints and odor were evaluated with reference to the evaluation method in the previous section.

The test results are summarized in Table 10.

It can be seen from the test results in Tables 9 and 10 that the radiation curable gravure ink composition of the present disclosure can be applied to different substrate surfaces and has excellent application properties.

TABLE 10

| Formula | A1-4 35 | A2-1 10 | B-2 25 | C-1 5 | D-1 5 | Black pigment 8 | Filler 10 | Levelling agent 1 | Polymerization inhibitor 1 |
|---|---|---|---|---|---|---|---|---|---|
| Test items | | | | | Test results | | | | |
| Substrate | PET | | PVC | | | PP | | PE | |
| Adhesion Fastness A % | 98 | | 98 | | | 94 | | 95 | |
| Abrasion resistance | 0.023 | | 0.020 | | | 0.025 | | 0.025 | |
| Appearance | Qualified | | Qualified | | | Qualified | | Qualified | |
| Odor | ○ | | ○ | | | ○ | | ○ | |

Corresponding to the technical scheme of the aforementioned third typical embodiment, the Embodiments are as follows:

1. Preparation of Modified Pigment (1) Inorganic Modified Pigment

After drying carbon black a-1 (manufactured by Mitsubishi Chemical Holdings, MA100) at 60-70° C. for 3 h, it was ground in a mortar to an average particle size of about 0.3 μm. Subsequently, 100 g of carbon black was weighed and added into a 1 L flask and 800 ml of deionized water was added, then the mixture was stirred and ultrasonically dispersed into a homogeneous suspension.

The suspension was heated in a thermostatic water bath and stabilized at about 65° C. and the pH was adjusted to 9.

11.8 g of $Na_2SiO_3 \cdot 9H_2O$ was weighed and dissolved in 110 ml of water to prepare a solution, the solution was slowly dropwise added into the flask, the mixture was stirred at a constant speed, and 10% hydrochloric acid was simultaneously dropwise added to adjust the pH in a range of 4-9. After adding dropwise, the mixture was stirred at constant temperature for 30 min.

And after the reaction was finished, the suspension was filtered, washed with deionized water, and dried at 105° C. for 20 min, and silica-coated black modified pigment A-1 was obtained by TEM analysis.

After the determination, the modified pigment A-1 has a DBP oil absorption of 220 ml/100 g, average particle size of 0.46 μm (measured by TEM), and a pH of 8.

Referring to the preparation method of A-1, carbon black a-1 was replaced with other kinds of inorganic pigments, and the same oxide coating modification treatment was carried out to obtain corresponding modified pigments. The results are shown in the following table:

TABLE 11

| Selected pigments | Modified pigment | DBP oil absorption ml/100 g | Particle size μm | pH |
|---|---|---|---|---|
| Titanium dioxide R706 (a-2) | A-2 | 215 | 0.55 | 7.2 |

(2) Organic Modified Pigment 150 g of a calcium chloride solution with a mass fraction of 20%, 40 g of absolute ethyl alcohol and 20 g of a hydrochloric acid solution with a mass fraction of 10% were mixed and stirred at 350 r/min for 30 min, 30 g of nano silicon dioxide was added, ultrasonic dispersion was carried out for 30 min to obtain a dispersion liquid, carbon dioxide gas was introduced into the dispersion liquid until no precipitate was generated, the mixture was stood for 8-10 h and filtered to obtain filter residue; the filter residue was washed with deionized water for 3-5 times, transferred into a drying box, and dried to constant weight under 105-110° C. to obtain an ink absorption substrate.

10 g of the ink-absorbing substrate and 20 g of C. I. Pigment Blue 61 (a-3) were added to 400 g of a sodium carbonate solution with a mass fraction of 5%, and the mixture was stirred in a 45° C. thermostatic water bath at 350 r/min for 24 h to obtain a loading solution.

100 g of tetrabutyl titanate, 1-2 g of silane coupling agent KH-560 and 200 ml of deionized water were added into the loading solution, the mixture was uniformly mixed, and stirred in a 90° C. constant-temperature water bath at 350 r/min for 5 h to obtain a titanium dioxide-coated organic pigment mixed solution.

The coated organic pigment mixed solution was put into a hydrothermal reaction kettle, a heat preservation reaction was carried out at 110° C. for 5 h, the reactant was cooled to room temperature and filtered to obtain a filter cake, the filter cake was washed twice with deionized water, transferred into a drying oven, dried to constant weight at 105° C., and the dried product was loaded into a grinder for grinding to obtain the organic modified pigment A-3. The core-shell coating structure of the organic modified pigment A-3 is determined by TEM analysis.

After the determination the modified pigment A-3 has a DBP oil absorption of 225 ml/100 g, average particle size of 0.56 μm, and a pH was 5.5.

Referring to the preparation method of A-3, a-3 was replaced with other kinds of organic pigments, and the same oxide coating modification treatment was carried out to obtain corresponding modified pigments. The results are shown in the following table:

TABLE 12

| Selected pigments | Modified pigment | DBP oil absorption ml/100 g | Particle size μm | pH |
|---|---|---|---|---|
| Lithol Rubine A68C.I.PR57:1 (a-4) | A-4 | 230 | 0.48 | 7.5 |
| Fast Yellow G (a-5) | A-5 | 233 | 0.61 | 6.0 |

2. Preparation of Radiation Curable Gravure Ink

According to the formulation shown in Table 13, the raw materials were uniformly stirred for 1 h by using a high-speed stirrer under the condition of a yellow light lamp, then ground by using a sanding machine, and then filtered through a filter screen with a particle size of 1 μm to obtain the radiation cured gravure ink.

Unless otherwise specified, the amounts described in the Embodiments are parts by mass In the Table, component A refers to modified pigments and component B refers to cationic polymerizable compounds; component C refers to free radical polymerizable compounds; component D refers to cationic photoinitiators, component E refers to free radical photoinitiators, and component F refers to filler.

TABLE 13

| Components and parts by mass | A 12 | B B1 35 | B2 10 | C 20 | D 5 | E 5 | F 10 | Other components Sensitizer 1 | Levelling agent 1 | Polymerization inhibitor 1 |
|---|---|---|---|---|---|---|---|---|---|---|
| Embodiment 27 | A-1 | B1-1 | B2-1 | C-1 | D-1 | E-1 | F-1 | G1-1 | G2 | G3 |
| Embodiment 28 | A-2 | 61-1 | B2-1 | C-1 | D-1 | E-2 | F-1 | G1-2 | | |
| Embodiment 29 | A-3 | B1-2 | B2-1 | C-1 | D-2 | E-3 | F-2 | G1-3 | | |
| Embodiment 30 | A-4 | B1-1 | B2-1 | C-1 | D-2 | E-2 | F-2 | G1-1 | | |
| Embodiment 31 | A-5 | B1-1 | B2-1 | C-1 | D-3 | E-3 | F-3 | G1-2 | | |
| Embodiment 32 | A-1 | B1-2 | B2-1 | C-1 | D-3 | E-3 | F-3 | G1-2 | | |
| Embodiment 33 | A-1 | B1-3 | B2-1 | C-2 | D-4 | E-2 | F-1 | G1-1 | | |
| Embodiment 34 | A-2 | B1-2 | B2-1 | C-2 | D-4 | E-1 | F-1 | G1-1 | | |
| Embodiment 35 | A-2 | B1-3 | B2-2 | C-1 | D-1 | E-2 | F-2 | G1-2 | | |
| Embodiment 36 | A-3 | B1-3 | B2-1 | C-2 | D-2 | E-3 | F-2 | G1-2 | | |
| Embodiment 37 | A-4 | B1-4 | B2-2 | C-1 | D-3 | E-2 | F-3 | G1-3 | | |
| Embodiment 38 | A-5 | B1-5 | B2-3 | C-1 | D-4 | E-2 | F-3 | G1-3 | | |
| Embodiment 39 | a-1 | B1-1 | B2-1 | C-1 | D-1 | E-1 | F-1 | G1-1 | | |
| Embodiment 40 | a-2 | B1-2 | B2-1 | C-1 | D-2 | E-2 | F-2 | G1-2 | | |
| Embodiment 41 | a-3 | B1-3 | B2-1 | C-2 | D-3 | E-3 | F-2 | G1-1 | | |
| Embodiment 42 | a-4 | B1-5 | B2-2 | C-2 | D-1 | E-1 | F-3 | G1-3 | | |

TABLE 14

| Components and parts by mass | Modified pigment 10 | Cationic polymerizable compounds | | Cationic photoinitiator C 12 | Filler D 5 | Other optional components | | |
|---|---|---|---|---|---|---|---|---|
| | | Oxetane-based compound B1 50 | Epoxy-based compound B2 20 | | | Sensitizer 1 | Levelling agent 1 | Polymerization inhibitor 1 |
| Comparative Embodiment 1 | a-1 | B1-1 | B2-1 | D-1 | F-1 | G1-1 | G2 | G3 |
| Comparative Embodiment 2 | a-2 | B1-2 | B2-1 | D-2 | F-2 | G1-1 | | |
| Comparative Embodiment 3 | a-3 | B1-1 (70) | — | D-1 | F-1 | G1-1 | | |

In Tables 13 and 14, the specific meanings of the components are as follows:

Modified pigment: as shown in "1. Preparation of modified pigments";

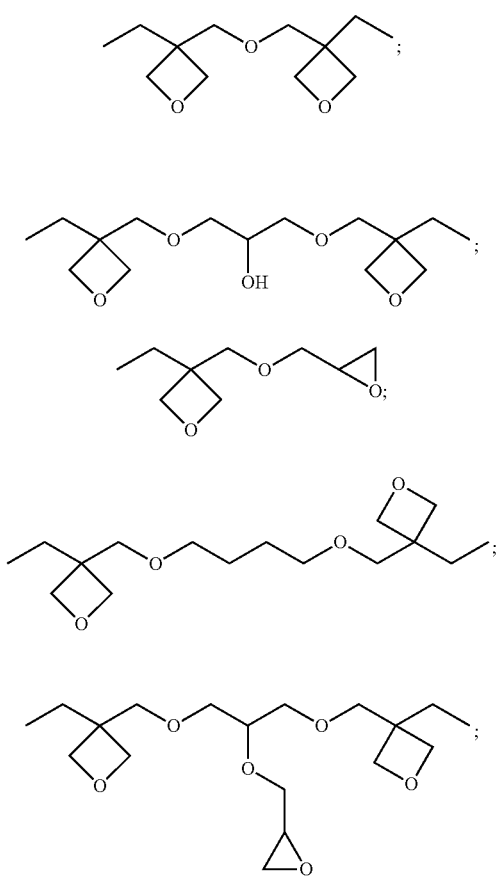

B1-1

B1-2

B1-3

B1-4

B1-5

B2-1: 3,4-epoxycyclohexylmethyl-3',4'-epoxycyclohexyl carboxylate, Jiangsu Tetra New Material Technology Co., Ltd.;

B2-2: bis ((3,4-epoxycyclohexyl) methyl) adipate, Jiangsu Tetra New Material Technology Co., Ltd.;

B2-3: 4-vinyl-1-cyclohexene diepoxide;

C-1: trimethylolpropane triacrylate, Sartomer;

C-2: tripropylene glycol diacrylate, Sartomer;

D-1: bis (4-(diphenyl sulfonium) phenyl) sulfide-bis (hexafluorophosphate) and 4-(phenylthio) phenyl diphenyl sulfide hexafluorophosphate;

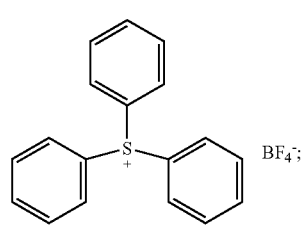

D-2

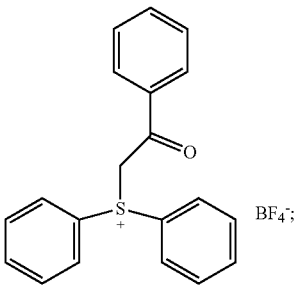

D-3

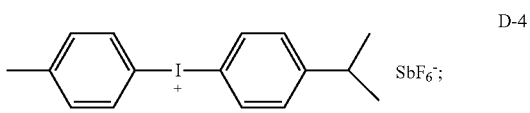

D-4

E-1: 2-methyl-1-[4-(methylthio) phenyl]-2-(4-morpholinyl)-1-propanone, BASF;

E-2: 2-hydroxy-2-methyl-1-phenyl-1-propanone, BASF;

E-3: 1-hydroxycyclohexylphenymethanone, BASF;

F-1: silica A-200, Evonik Industries AG;

F-2: titanium dioxide R 706, DuPont;

F-3: calcium carbonate SW-01, Polyplastics Co., Ltd.;

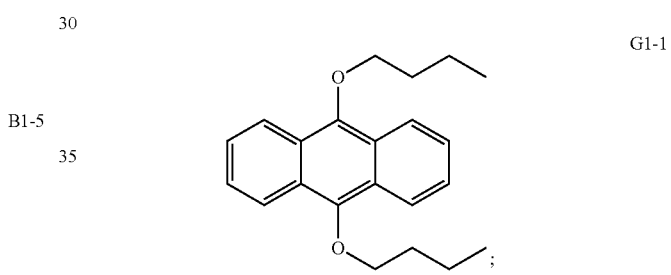

G1-1

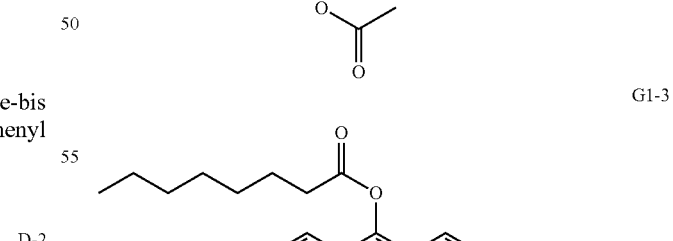

G1-2

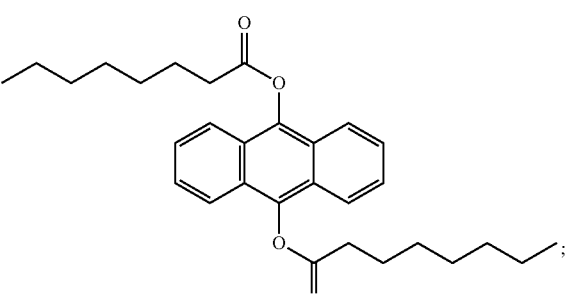

G1-3

G2: BYK 333, Evonik Industries AG;

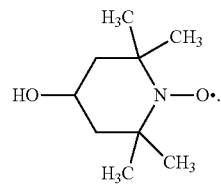

G3: Hindered Nitroxyl Stabilizer

3. Test and Evaluation for Gravure Ink Performance

A Songde solvent-free gravure press (Model: A380) was used for printing, wherein a LED lamp with a wavelength of 395 nm is additionally arranged on the machine to serve as a radiation light source. The samples of Embodiments and Comparative Embodiments were tested and evaluated for performance according to QBT 1046-2012 "Gravure Surface Ink for Plastic Film Industry Standard".

The ink viscosity test was the same as above, the storage stability test was the same as above, and the curing drying rate test was the same as above ink drying rate test.

4. Test and Evaluation for Prints Performance

Under the condition of the slowest linear speed (Embodiment: 230 m/min; Comparative Embodiment: 160 m/min) that ensured that the gravure ink could be completely cured and dried, the gravure inks were printed on a PET film substrate with a thickness of about 10 μm. After standing for 24 h, the cured coatings were tested and evaluated for physical properties including adhesion fastness, abrasion resistance and appearance of prints.

(1) Test for Adhesion Fastness was the Same as Above (2) Test for Abrasion Resistance The measurement was carried out according to "GB/T 1768-2006 Paints and varnishes-Determination of resistance to abrasion-Rotating abrasive rubber wheel method". Specific implementation methods are as follows:

500 g weight was weighted on a rubber grinding wheel at 23±2° C. and 50±5% relative humidity, then the paint film was rubbed by the rubber grinding wheel fixed on a abrasion tester, and the abrasion resistance of the paint film was expressed by the mass loss of the paint film after 500 cycles of friction in g/500 r.

The abrasive mass below 0.030 g/500 r was considered to be a very good product.

(3) Test for Appearance of the Prints

The evaluation results are summarized in Table 15.

TABLE 15

| | Viscosity | Storage stability | Curing drying rate | Adhesion fastness | Abrasion resistance | Appearance of prints |
|---|---|---|---|---|---|---|
| Embodiment 27 | 14 | ○ | 235 | 95 | 0.018 | Qualified |
| Embodiment 28 | 15 | ○ | 255 | 96 | 0.016 | Qualified |
| Embodiment 29 | 14 | ○ | 250 | 94 | 0.015 | Qualified |
| Embodiment 30 | 13 | ○ | 260 | 95 | 0.018 | Qualified |
| Embodiment 31 | 18 | ○ | 255 | 96 | 0.016 | Qualified |
| Embodiment 32 | 15 | ○ | 265 | 97 | 0.020 | Qualified |
| Embodiment 33 | 14 | ○ | 275 | 95 | 0.017 | Qualified |
| Embodiment 34 | 15 | ○ | 270 | 95 | 0.022 | Qualified |
| Embodiment 35 | 16 | ○ | 275 | 94 | 0.021 | Qualified |
| Embodiment 36 | 15 | ○ | 260 | 94 | 0.018 | Qualified |
| Embodiment 37 | 16 | ○ | 255 | 95 | 0.021 | Qualified |
| Embodiment 38 | 17 | ○ | 265 | 96 | 0.023 | Qualified |
| Embodiment 39 | 23 | ◎ | 170 | 92 | 0.029 | Unqualified |

TABLE 15-continued

| | Viscosity | Storage stability | Curing drying rate | Adhesion fastness | Abrasion resistance | Appearance of prints |
|---|---|---|---|---|---|---|
| Embodiment 40 | 24 | ◎ | 195 | 91 | 0.031 | Unqualified |
| Embodiment 41 | 22 | ◎ | 180 | 90 | 0.034 | Qualified |
| Embodiment 42 | 25 | ● | 205 | 89 | 0.045 | Unqualified |
| Comparative Embodiment 1 | 29 | ◎ | 135 | 92 | 0.051 | Unqualified |
| Comparative Embodiment 2 | 27 | ◎ | 145 | 90 | 0.052 | Unqualified |
| Comparative Embodiment 3 | 35 | ◎ | 121 | 90 | 0.063 | Unqualified |

It can be seen from the evaluation results in Table 15 that the radiation curable gravure ink composition of the present disclosure has low viscosity, high storage stability, and significantly improved curing speed. The cured coating is very excellent in abrasion resistance and adhesion performance, the prints are neat in pattern, smooth in edge, uniform in ink color, and excellent in application performance.

5. Further Test and Evaluation for Performance

The radiation curable gravure ink composition was applied to paper and plastic film substrates respectively, and the application performance was further verified.

(1) Paper Substrate

The performance of the radiation curable gravure ink provided by the disclosure applied to paper substrates was evaluated according to the requirements of the substrate and the testing method in the evaluation standard GB/T 26461-2011 Gravure ink for paper.

The ink composition was prepared according to the formulation in Table 16, and the ink was printed on the offset paper conforming to GB/T 10335.1 by a Songde solvent-free gravure press (Model: A380), and a high-pressure mercury lamp (RW-UV.70201) was used for radiation curing with a linear power of 80 W/cm to obtain a printed pattern with a thickness of about 10 μm.

The viscosity, storage stability and curing drying rate of the ink composition, as well as the coating adhesion fastness, abrasion resistance and appearance of prints were evaluated with reference to the above-mentioned evaluation methods.

The test results are summarized in Table 16.

TABLE 16

| Components and parts by mass | A-4 | B1-2 | B2-1 | C-1 | D-1 | E-1 | G2 | G3 |
|---|---|---|---|---|---|---|---|---|
| | 8 | 40 | 15 | 25 | 6 | 4 | 1 | 1 |

| Test items | Test results |
|---|---|
| Viscosity | 14 |
| Storage stability | ○ |
| Curing drying rate | 255 |
| Adhesion fastness | 95 |
| Abrasion resistance | 0.021 |
| Appearance of prints | Qualified |

(2) plastic Film Substrate

The performance of the radiation curable gravure ink provided by the disclosure applied to different kinds of plastic film substrates was evaluated according to the requirements of the substrate and the testing method in the evaluation standard GB/T 1046-2012 "Gravure surface ink for plastic film"

Gravure ink composition was prepared according to the formulation in Table 17. The ink was printed on the PET, PVC: PP and PE substrates by a Songde solvent-free gravure press (Model: A380) respectively, and a LED lamp was used as radiation source with an intensity of light source of 15 w/cm² to obtain a printed pattern with a thickness of about 10 μm.

The viscosity, storage stability and curing drying rate of the ink composition, as well as the coating adhesion fastness on different plastic film substrates, abrasion resistance and appearance of prints were evaluated with reference to the above-mentioned evaluation methods.

The test results are summarized in Table 17.

TABLE 17

| Components and parts by mass | A-5 10 | B1-1 45 | B2-1 15 | C-2 15 | D-2 6 | E-2 6 | G1-1 1 | G2 1 | G3 1 |
|---|---|---|---|---|---|---|---|---|---|
| Test items | | | | Test results | | | | | |
| Viscosity | | | | 16 | | | | | |
| Storage stability | | | | ○ | | | | | |
| Curing drying rate | | | | 245 | | | | | |
| Substrate | | PET | | PVC | | PP | | PE | |
| Adhesion fastness | | 97 | | 96 | | 93 | | 95 | |
| Abrasion resistance | | 0.023 | | 0.020 | | 0.022 | | 0.021 | |
| Appearance of prints | | Qualified | | Qualified | | Qualified | | Qualified | |

It can be seen om the test results in Tables 1 and 17 that the radiation curable gravure ink containing modified pigments of the present disclosure can be applied to different substrate surfaces and has excellent application properties.

The foregoing descriptions are only the preferred Embodiments of the present disclosure and are not intended to limit the present disclosure, and various changes and modifications can be made by those skilled in the art. Any modifications, equivalent substitutions, improvements, and the like within the spirit and principles of the disclosure are intended to be included within the scope of the present disclosure.

What is claimed is:

1. A radiation curable gravure ink, wherein the radiation curable gravure ink comprises following components: the cationic polymerizable compound comprising the oxetane-based compound containing a hydroxyl and an alicyclic epoxy compound; the cationic photoinitiator; the pigment; and a filler;
the radiation curable gravure ink also comprises a modified pigment, a free radical polymerizable compound and a free radical photoinitiator, the modified pigment comprises a pigment and inorganic oxide nanoparticles coated on the surface of the pigment; the modified pigment has a DBP oil absorption of from 150 ml/100 g to 250 ml/100 g, a particle size of from 0.01 μm to 1 μm, and a pH of from 4.5 to 10.

2. The radiation curable gravure ink according to claim 1, wherein the oxetane-based compound containing a hydroxyl is selected from substituted or unsubstituted alkanes and alkenes in which at least one end-capping group is an oxetane group and contains a hydroxyl group, wherein H on the oxetane end-group can be optionally substituted with $C_1$-$C_4$ alkyl groups.

3. The radiation curable gravure ink according to claim 1, wherein the oxetane-based compound containing hydroxyl is an alkane or an alkene having at least one end-capping group

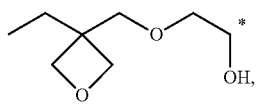

—$CH_2$— in non-end-capping groups can each independently be substituted with —O—, —COO—, —OCO—, —$SO_2$—, 1,4-phenylene or

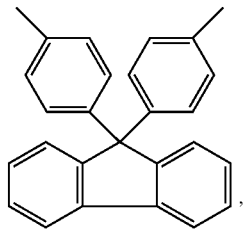 [SMILES: Cc1ccc(C2(c3ccc(C)cc3)c3ccccc3-c3ccccc32)cc1]

provided that two O groups are not directly bound.

4. The radiation curable gravure ink according to claim 1, wherein the alicyclic epoxy compound is an epoxy compound having an epoxycyclohexyl group.

5. The radiation curable gravure ink according to claim 1, wherein a mass ratio of the oxetane-based compound containing hydroxyl to the alicyclic epoxy compound is (2-5):1.

6. The radiation curable gravure ink according to claim 1, wherein the free radical polymerizable compound is selected from an acrylate-based monomer compound or a methacrylate-based monomer compound, or the cationic photoinitiator is selected from one or a combination of two or more of a group consisted of iodonium salt, sulfonium salt, and arylferrocenium salt.

7. The radiation curable gravure ink according to claim 6, wherein a mass ratio of the cationic polymerizable compound to the radiation curable gravure ink is from 30% to 80%.

8. The radiation curable gravure ink according to claim 6, wherein in terms of mass percentage, a content of the cationic photoinitiator in the gravure ink is from 1% to 20%, or in terms of mass percentage, a content of the free radical photoinitiator in the gravure ink is from 1% to 20%.

9. The radiation curable gravure ink according to claim 1, wherein the free radical polymerizable compound is selected from at least one of compounds having free radical polymerizable groups such as (meth) acryloyl, (meth) acryloyloxy, (meth) acrylamido, vinyl aryl, vinyl ether, and vinyloxycarbonyl, or the free radical photoinitiator is selected from one or more of a group consisted of benzoin, acetophenone-based photoinitiator, α-hydroxyketone-based photoinitiator, α-aminoketone-based photoinitiator, acylphosphorus oxide-based photoinitiator, benzophenone-based photoinitiator, thioxanthone-based photoinitiator, anthraquinone-based photoinitiator, and oxime ester-based photoinitiators.

10. The radiation curable gravure ink according to claim 1, wherein the cationic photoinitiator is selected from at least one of

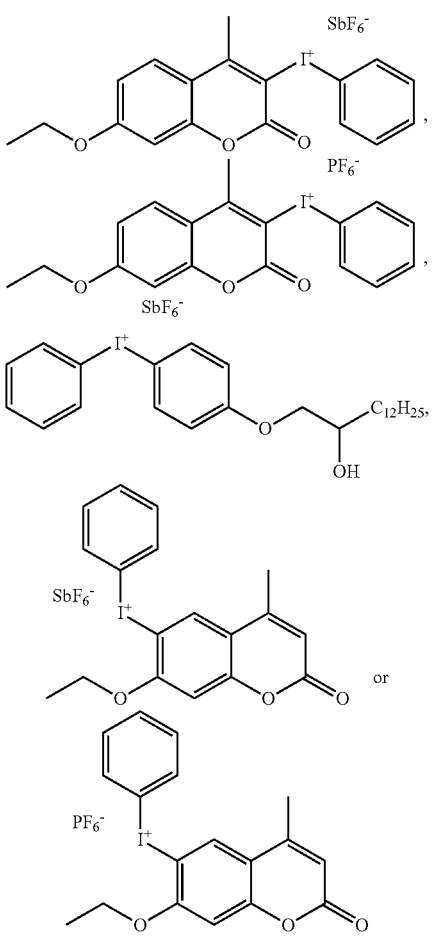

or selected from any one or more of a group consisted of compounds having a following structure shown in Formulae (I), (II), (III) and/or (V):

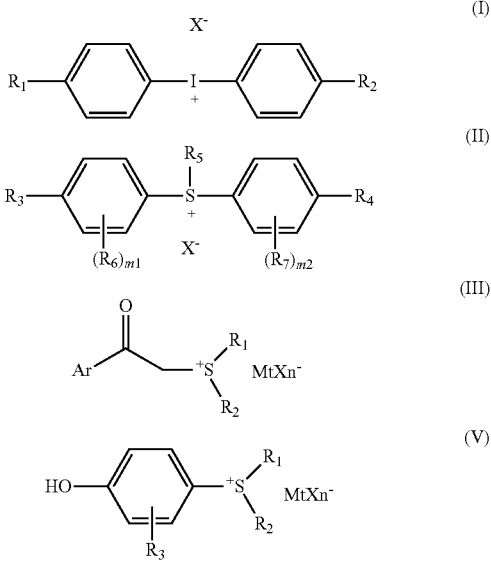

wherein, $R_1$ and $R_2$ each independently represent hydrogen, $C_1$-$C_{20}$ linear or branched alkyl, $C_4$-$C_{20}$ cycloalkylalkyl or alkylcycloalkyl, and the acyclic —$CH_2$— in these groups can be optionally substituted by —O—, —S— or 1,4-phenylene;

$R_3$ and $R_4$ each independently represent hydrogen, $C_1$-$C_{20}$ linear or branched alkyl, $C_4$-$C_{20}$ cycloalkylalkyl or alkylcycloalkyl, $C_6$-$C_{20}$ substituted or unsubstituted aryl, and the acyclic —$CH_2$— in these groups can be optionally substituted by —O—, —S— or 1,4-phenylene;

$R_5$ represents $C_6$-$C_{20}$ substituted or unsubstituted aryl, $C_6$-$C_{20}$ substituted or unsubstituted alkylaryl, $C_1$-$C_{20}$ straight or branched alkyl, $C_4$-$C_{20}$ cycloalkylalkyl or alkylcycloalkyl, substituted or unsubstituted thiophenylphenyl, and the acyclic —$CH_2$— in these groups can be optionally substituted by carbonyl, —O—, —S— or 1,4-phenylene;

$R_6$ and $R_7$ each independently represent alkyl, hydroxyl, alkoxy, alkylcarbonyl, arylcarbonyl, alkoxycarbonyl, aryloxycarbonyl, arylthiocarbonyl, acyloxy, arylthio, aryl, heterocyclic hydrocarbon, aryloxy, alkylsulfinyl, arylsulfinyl, alkylsulfonyl, arylsulfonyl, hydroxyl (poly) alkyleneoxy, substitutable amino, cyano, nitro, or a halogen atom, $m_1$ and $m_2$ each represent a number of $R_6$ and $R_7$ and represent an integer of 0 to 4;

$X^-$ each independently represents $M^-$, $ClO_4^-$, $CN^-$, $HSO_4^-$, $NO_3^-$, $CF_3COO^-$, $(BM_4)^-$, $(SbM_6)^-$, $(AsM_6)^-$, $(PM_6)^-$, $Al[OC(CF_3)_3]_4^-$, sulfonate ion, $B(C_6M_5)_4^-$ or $[(Rf)_bPF_{6-b}]^-$, wherein M is halogen, Rf represents alkyl with more than or equal to 80% of hydrogen atoms substituted by fluorine atoms, b represents an integer of 1-5, and b Rf groups are the same or different from each other;

$MtXn^-$ is a non-nucleophilic anion, and is selected from any one of $BF_4^-$, $ClO_4^-$, $FSO_3^-$, $PF_6^-$, $ASF_6^-$, $SbF_6^-$, $CF_3SO_3^-$ and $(C_6H_5)_4B^-$.

11. The radiation curable gravure ink according to claim 1, wherein the filler is selected from one or a mixture of two of nano calcium carbonate and silica.

12. The radiation curable gravure ink according to claim 1, wherein the inorganic oxide is selected from at least one of silica, titanium dioxide, iron oxide, and alumina.

13. The radiation curable gravure ink according to claim 1, wherein the modified pigment has the DBP oil absorption of from 200 ml/100 g to 250 ml/100 g, and the particle size of from 0.1 μm to 0.8 μm.

14. The radiation curable gravure ink according to claim 1, wherein the pH of the modified pigment is from 5 to 9.

15. The radiation curable gravure ink according to claim 1, wherein the pigment is an organic pigment or an inorganic pigment, the organic pigment is selected from any one of azo dye, thioindigo dye, indanthrone dye, isoindanthrone dye, anthanthrone dye, anthraquinone dye, isoviolanthrone dye, triphenyldioxazine dye, quinacridone dye and phthalocyanine dye, the inorganic pigment is selected from any one of carbon black, titanium dioxide, silica, alumina, iron oxide and sulfide.

16. The radiation curable gravure ink according to claim 1, wherein the epoxy-based compound is an alicyclic epoxy compound, the alicyclic epoxy compound is an epoxy compound having an epoxycyclohexyl group.

17. The radiation curable gravure ink according to claim 1, wherein the radiation curable gravure ink also comprises a sensitizer, the sensitizer is an anthracene sensitizer.

18. Use of the radiation curable gravure ink of any one according to claim 1 in gravure printing, the use is gravure printing paper, plastic and film.

19. The radiation curable gravure ink according to claim 2, wherein the oxetane-based compound containing hydroxyl is an alkane or an alkene having at least one end-capping group
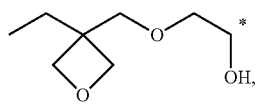
—CH$_2$— in non-end-capping groups can each independently be substituted with —O—, —COO—, —OCO—, —SO$_2$—, 1,4-phenylene or
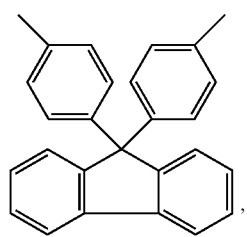 [SMILES: Cc1ccc(C2(c3ccc(C)cc3)c3ccccc3-c3ccccc32)cc1]
provided that two O groups are not directly bound.
* * * * *